(12) United States Patent
Song et al.

(10) Patent No.: US 9,379,835 B2
(45) Date of Patent: *Jun. 28, 2016

(54) METHOD OF NETWORK MANAGEMENT BY ASSISTANCE FROM TERMINAL USING CONTROL-PLANE SIGNALING BETWEEN TERMINAL AND NETWORK

(71) Applicant: QUALCOMM Incorporated, San Diego, CA (US)

(72) Inventors: Osok Song, San Diego, CA (US); Masato Kitazoe, Tokyo (JP); Oronzo Flore, Ostuni (IT); Anjali Mishra, Encinitas, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,135

(22) Filed: Aug. 19, 2013

(65) Prior Publication Data

US 2013/0329563 A1    Dec. 12, 2013

Related U.S. Application Data

(63) Continuation of application No. 12/403,925, filed on Mar. 13, 2009, now Pat. No. 8,780,732.

(60) Provisional application No. 61/037,433, filed on Mar. 18, 2008, provisional application No. 61/109,024, filed on Oct. 28, 2008.

(51) Int. Cl.
  *H04J 1/16*  (2006.01)
  *H04J 3/14*  (2006.01)
  *H04W 24/02*  (2009.01)
  *H04W 24/10*  (2009.01)

(52) U.S. Cl.
  CPC ............. *H04J 3/14* (2013.01); *H04W 24/02* (2013.01); *H04W 24/10* (2013.01)

(58) Field of Classification Search
  CPC ..... H04W 24/00; H04W 24/02; H04W 24/04; H04W 24/06; H04W 24/08; H04W 24/10

USPC .................................................. 370/241–252
See application file for complete search history.

(56) References Cited

U.S. PATENT DOCUMENTS 7,319,878 B2   1/2008  Sheynblat et al.
7,564,778 B2 *  7/2009  Soumiya et al. .............. 370/221
(Continued)

FOREIGN PATENT DOCUMENTS

CN   1937579 A    3/2007
EP   1667479 A1   6/2006
(Continued)

OTHER PUBLICATIONS

Cornelia Kappler et al, A Framework for Self-organized Network Composition, in Proc. WAC, 2004, found in the Internet at http://citeseerx.ist.psu.edu/viewdoc/summary"doi=10.1.1.105.5258, section 4.3-5.

(Continued)

*Primary Examiner* — Kan Yuen

(57) ABSTRACT

Systems and methodologies are described that facilitate network management and optimization. As described herein, a network and a device communicating with the network can exchange network management information, thereby supporting a Self Organized Network (SON) architecture for improved network management and optimization performance. A Non-Access Stratum (NAS) layer protocol and/or an Internet Protocol (IP) application, in combination with a set of associated network management messages, can be utilized to exchange network management information between a device and a network. As further described herein, various procedures can be utilized to install a SON policy to a device in order to define device behavior for operations such as collecting and reporting information related to network management. Additionally, a set of standardized events can be defined, based on which a device can detect the occurrence of an event and report the occurrence to an associated network.

16 Claims, 25 Drawing Sheets

(56) References Cited

U.S. PATENT DOCUMENTS

| | | | |
|---|---|---|---|
| 7,948,377 | B2 | 5/2011 | Ansiaux et al. |
| 2002/0021671 | A1 | 2/2002 | Quinlan |
| 2003/0142629 | A1* | 7/2003 | Krishnamurthi et al. ..... 370/249 |
| 2004/0067783 | A1 | 4/2004 | Lenchik et al. |
| 2005/0119020 | A1 | 6/2005 | Cheng et al. |
| 2006/0128371 | A1 | 6/2006 | Dillon et al. |
| 2007/0202918 | A1* | 8/2007 | Shin ............... H04W 24/00 455/562.1 |
| 2007/0230421 | A1 | 10/2007 | Roadknight |
| 2007/0234139 | A1* | 10/2007 | Kalantri et al. ............... 714/712 |
| 2009/0016253 | A1* | 1/2009 | Lewis et al. .................. 370/312 |
| 2009/0257353 | A1 | 10/2009 | Song et al. |

FOREIGN PATENT DOCUMENTS

| | | |
|---|---|---|
| GB | 2435984 | 9/2007 |
| JP | 10503637 A | 3/1998 |
| JP | 2002271833 A | 9/2002 |
| JP | 2002300100 A | 10/2002 |
| JP | 2007525040 A | 8/2007 |
| RU | 2270526 C2 | 2/2006 |
| RU | 2005139137 A | 5/2006 |
| WO | 2006063309 | 6/2006 |
| WO | 2006124169 A2 | 11/2006 |
| WO | 2006138516 A2 | 12/2006 |
| WO | WO-2007110968 A1 | 10/2007 |

OTHER PUBLICATIONS

International Search Report & Written Opinion—PCT/US2009/037433, International Search Authority—European Patent Office—Jul. 14, 2009.

Qualcomm Europe: "Automatic Measurement Collection for RF optimization" 3GPP Draft; R3-072118 Automatic Measurement Collection for RF Optimization, 3rd Generation Partnership Project (3GPP), Mobile Competence Centre ; 650, Route Des Lucioles ; F-06921. Sophia-Antipolis Cedex ; France, vol. RAN WG3, No. Jeju Island; 20071105, Oct. 29, 2007, XP050162906 p. 1, paragraph 2—p. 3, paragraph 2.3; figure 1.

Requirement Specification by the NGMN Alliance NGMN Recommendation on SON and O&M Requirements, Next Generation Mobile Networks Requirements, Ver.1.23, Dec. 5, 2008, found in the Internet at http://www.ngmn.org/uploads/media/NGMN_Recommendation_on_SON_and_O_M_Requirements.pdf.

T-Mobile et al: "SON use-case: Neighbour Relationship optimisation" 3GPP Draft; R3-071601, 3rd Generation Partnership Project (3GPP), Mobile Competence Centre; 650, Route Des Lucioles; F-06921 Sophia-Antipolis Cedex; France, vol. RAN WG3, No. Athens, Greece; Aug. 20, 2007, Aug. 18, 2007, XP050162413 the whole document.

European Search Report—EP13181914—Search Authority—The Hague—Oct. 28, 2013.

Taiwan Search Report—TW098108792—TIPO—Oct. 22, 2013.

NEC et al: "UE assistance for self-optimizing of network" , 3GPP Draft; R2-072432, 3rd Generation Partnership Project (3GPP), Mobile Competence Centre; 650, Route Des Lucioles; F-06921 Sophia-Antipolis Cedex; France, vol. RAN WG2, No. Orlando, USA; Jun. 22, 2007, XP050135267, pp. 1-4.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", V 8.2.0, ETSI TS 136 300, Oct. 2007.

\* cited by examiner

METHOD OF NETWORK MANAGEMENT BY ASSISTANCE FROM TERMINAL USING CONTROL-PLANE SIGNALING BETWEEN TERMINAL AND NETWORK

CROSS-REFERENCE

This application is a continuation of U.S. application Ser. No. 12/403,925, filed Mar. 13, 2009, and entitled "METHOD OF NETWORK MANAGEMENT BY ASSISTANCE FROM TERMINAL USING CONTROL-PLANE SIGNALING BETWEEN TERMINAL AND NETWORK", which claims the benefit of U.S. Provisional Application Ser. No. 61/037,443, filed Mar. 18, 2008, and entitled "METHOD OF NETWORK MANAGEMENT BY ASSISTANCE FROM TERMINAL USING CONTROL-PLANE SIGNALING BETWEEN TERMINAL AND NETWORK," and U.S. Provisional Application Ser. No. 61/109,024, filed Oct. 28, 2008, and entitled "SELF-HEALING OF SELF-OPTIMIZING NETWORKS," each of which is incorporated herein by reference in its entirety.

BACKGROUND

I. Field

The present disclosure relates generally to network communications, and more specifically to techniques for network management and optimization.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Communication networks are utilized to provide communication service to an assortment of communication terminals and/or other devices via a wired or wireless networking technology and/or a combination of technologies. In conventional communication networks, one or more network entities are responsible for optimizing the performance of the network for the devices that utilize the network. Such network entities can, for example, optimize network operations based on measurements and/or other observations received from various devices and/or locations in the network. However, obtaining the necessary measurements for network optimization can require significant operational expense. For example, in order to obtain measurements from devices and/or locations in a communication network, existing communication networks require costly techniques such as manual drive testing, wherein devices are manually moved throughout the network and tested in various locations in the network. Because processes such as manual drive testing are costly and time-consuming, it is additionally difficult to implement such processes for a pre-existing network under changing network conditions.

Accordingly, it would be desirable to implement low-complexity network optimization and management techniques that offer improved flexibility for rapidly changing network environments.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for supporting a Self Organized Network (SON) is described herein. The method can comprise defining one or more events associated with a communication network; identifying a SON policy that specifies information to be collected relating to respective defined events and one or more procedures for reporting collected information; establishing a communication interface between a designated network node and one or more user equipments (UEs); and instructing communication of the SON policy from the designated network node to the one or more UEs over the communication interface.

Another aspect relates to a wireless communications apparatus that can comprise a memory that stores data relating to definitions of respective network events and a SON policy that includes instructions for conducting and reporting measurements relating to respective network events. The wireless communications apparatus can further comprise a processor configured to designate a network management entity, to instruct communication of the SON policy from the designated network management entity to one or more terminals, to receive one or more reported measurements from the terminals via the designated management entity based on the SON policy, and to optimize operation of the wireless communications apparatus based at least in part on the reported measurements.

A third aspect relates to an apparatus that facilitates network management and optimization. The apparatus can comprise means for identifying a reporting policy that includes a list of event definitions and measurements associated with respective defined events; means for identifying a terminal capable of utilizing the reporting policy; and means for facilitating communication of the reporting policy from a pre-designated network node to the identified terminal.

A fourth aspect relates to a computer program product, which can comprise a computer-readable medium that includes code for determining one or more types of events to be logged by a network device; code for determining a schedule for obtaining reports of respective logged events from the network device; and code for assigning one or more of a network management server, a mobility management entity, or a Self-Organized Network (SON) application server to manage logging of the one or more determined types of events and reporting of respective logged events pursuant to the determined schedule at the network device.

A fifth aspect relates to an integrated circuit that can execute computer-executable instructions for maintaining a SON. The instruction can comprise compiling a SON policy to be utilized by one or more UEs, the SON policy comprising respective standardized event definitions obtained from a network management protocol and a reporting schedule for respective defined events; instructing communication of the SON policy from a designated network management node to the one or more UEs; receiving one or more event reports from the UEs via the network management node based on the SON policy; and optimizing network performance based at least in part on the received event reports.

In accordance with another aspect, a method for logging and reporting network events is described herein. The method can comprise receiving a SON policy from a network that specifies a list of definitions for respective network events, a list of measurements associated with the respective network events, and instructions for reporting measurements associated with the respective network events; detecting occurrence of a network event defined by the SON policy; performing one or more measurements associated with the detected network event based on the SON policy; and reporting the one or more measurements to the network based on the instructions for reporting measurements provided in the SON policy.

An additional aspect relates to a wireless communications apparatus that can comprise a memory that stores data relating to a SON entity. The wireless communications apparatus can further comprise a processor configured to receive an event definition list and respective sets of associated measurements from the SON entity, to detect occurrence of a defined event, to log measurements from a set of measurements associated with the detected event, and to report the logged measurements to the SON entity.

Yet another aspect relates to an apparatus that facilitates implementation of a SON. The apparatus can comprise means for receiving a set of event definitions, sets of measurements related to respective defined events, and a reporting schedule from a network; means for logging measurements upon occurrence of a defined event based on a set of measurements related to the event; and means for communicating the logged measurements to the network according to the reporting schedule.

Still another aspect relates to a computer program product, which can comprise a computer-readable medium that includes code for receiving a set of standardized network events, lists of measurements respectively associated with the network events, and instructions for reporting measurements associated with the network events to one or more of a network management entity or an Open Mobile Alliance (OMA) Device management (DM) server; code for detecting an event from the set of standardized network events; code for performing measurements in a list of measurements corresponding to the detected event; and code for reporting the performed measurements to the network management entity or the OMA DM server based on the received instructions.

A further aspect relates to an integrated circuit that can execute computer-executable instructions for logging and reporting events in a communication network. The instructions can comprise receiving a SON policy from the communication network, the SON policy specifying a list of network events, a set of measurements to log upon detection of a listed event, and instructions for reporting measurements to a designated network node; monitoring network operating state to detect occurrence of a listed event; performing the set of measurements upon detecting a listed event; and reporting the set of measurements to the designated network node according to the provided instructions.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
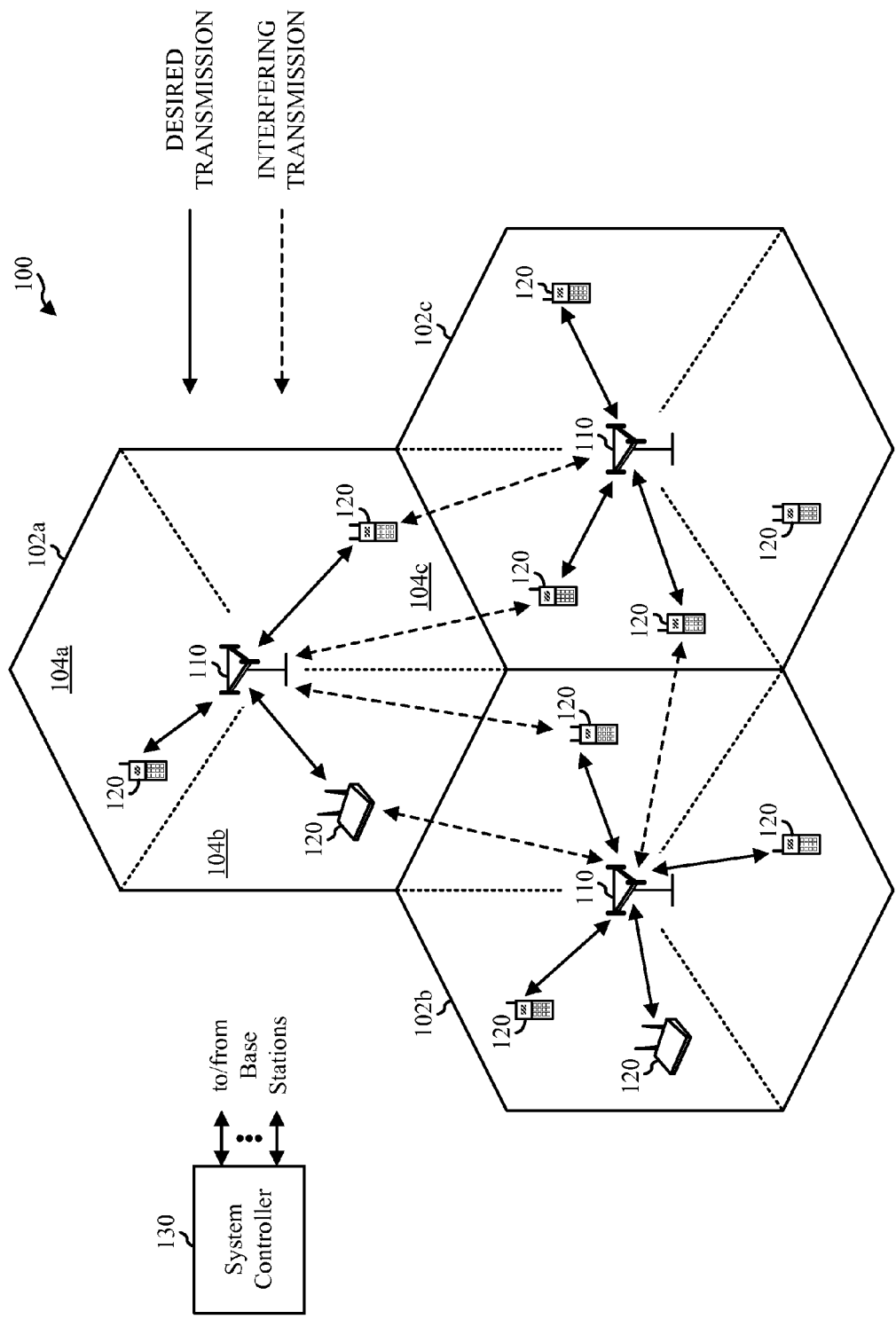
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Additionally, various aspects herein are presented in the context of a wireless communication system. It should be appreciated, however, that this context is provided by way of specific, non-limiting example and that the claimed subject matter is not intended to be limited to application in a wireless communication system unless otherwise stated in the respective claims. Accordingly, it should be appreciated that the various aspects herein can be applied to a communication network that employs any suitable wired and/or wireless communication technology or combination thereof.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B (e.g., an Evolved Node B or eNB), and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. Further, as used herein and generally in the art, the term "cell" can also be used to refer to the coverage area of a BTS depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell.

In accordance with one aspect, terminals 120 can be dispersed throughout the system 100. Each terminal 120 can be stationary or mobile. By way of non-limiting example, a terminal 120 can be an access terminal (AT), a mobile station, user equipment (UE), a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

As further illustrated by FIG. 1, each sector 104 in system 100 can receive "desired" transmissions from terminals 120 in the sector 104 as well as "interfering" transmissions from terminals 120 in other sectors 104. The total interference observed at a given sector 104 can include both intra-sector interference from terminals 120 within the same sector 104 and inter-sector interference from terminals 120 in other sectors 104. In one example, intra-sector interference can be substantially eliminated using OFDMA transmission from the terminals 120, which ensures orthogonality between transmissions of different terminals 120 in the same sector 104. Inter-sector interference, which is also known in the art as other sector interference (OSI), can result when transmissions in one sector 104 are not orthogonal to transmissions in other sectors 104.

Figure 2:
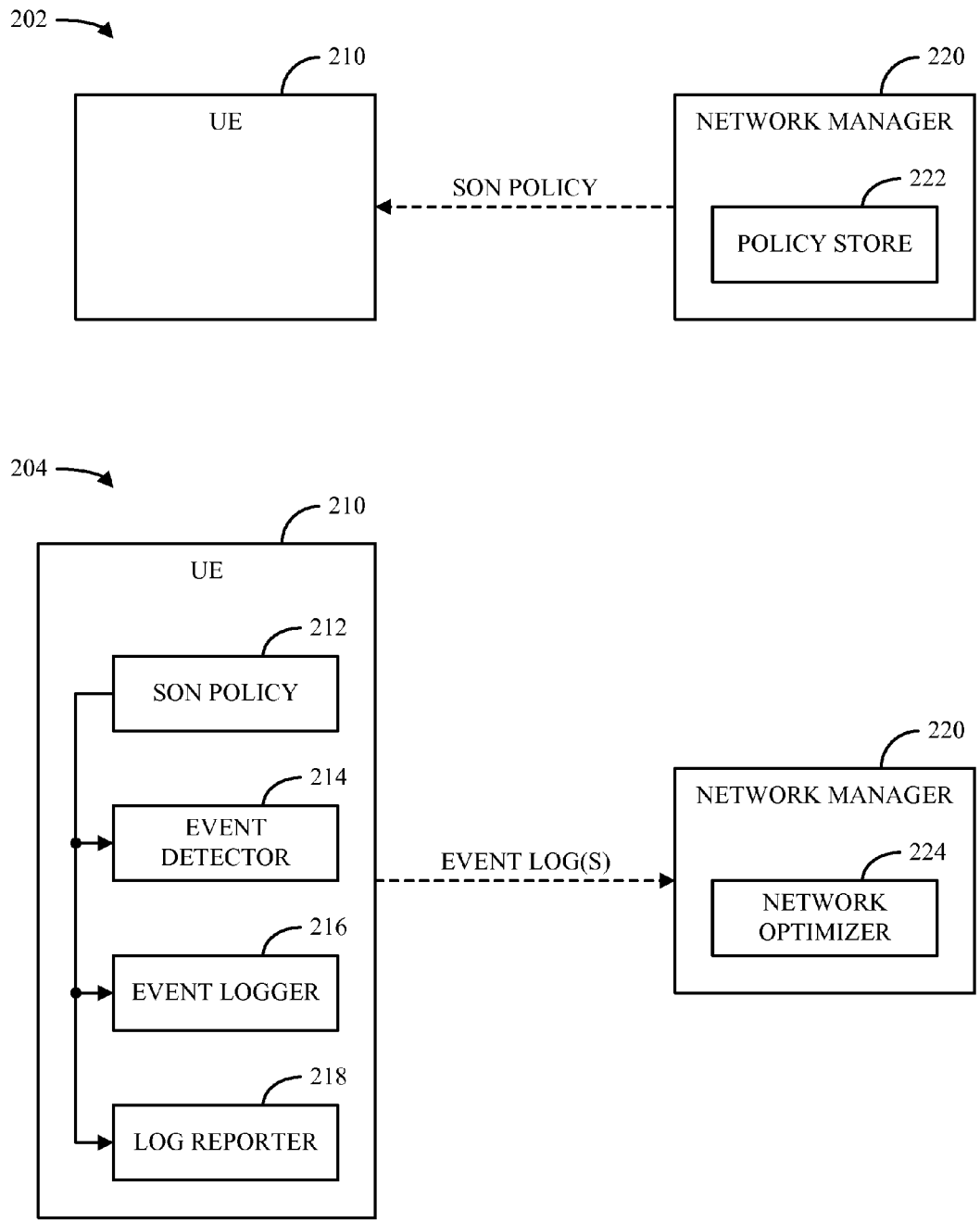
FIG. 2 illustrates block diagrams of a system for managing and optimizing a communication system in accordance with various aspects.

FIG. 2 illustrates block diagrams 202-204 of a system for managing and optimizing a communication system in accordance with various aspects provided herein. As diagrams 202-204 illustrate, the system can include a UE 210 and a network manager 220. While only one UE 210 and network manager 220 are illustrated in FIG. 2, it should be appreciated that the system illustrated by diagrams 202-204 can include any number of UEs 210 and/or network managers 220. It can be further appreciated that network manager 220 can be any appropriate network entity, such as a Mobility Management Entity (MME), a network controller, a network management server, or the like.

In accordance with one aspect, network manager 220 can utilize information relating to one or more UEs 210 in the network to optimize network performance. In conventional communication systems, a network manager would rely on manually obtained and communicated measurements from devices in the network to optimize network performance. These measurements can be obtained through drive testing and/or other manual testing procedures within the network. However, such procedures can be costly and time-consuming, which can render such procedures undesirable and infeasible to implement for a rapidly-changing network.

Accordingly, network manager 220 as illustrated by FIG. 2 can utilize a Self-Organized Network (SON) policy to standardize and automate the performance and/or reporting of measurements by UEs 210, thereby enabling collection of information and/or optimization based on collected information to be conducted in an automatic and autonomous manner. As a result, the need for manual drive testing and other similar manual measurements throughout a communication network can be significantly reduced.

In accordance with one aspect, network manager 220 can create and/or otherwise identify a SON policy (e.g., a SON policy stored by a policy store 222) to be used within a network associated with network manager 220. In one example, the SON policy can specify standardized events to be reported by a UE 210, techniques for measuring and/or logging such events, techniques for reporting logged events to network manager 220, or the like. In one aspect, by standardizing the events measured by a UE 210 and the manner in which such events are logged and reported back to network manager 220, network manager 220 can facilitate autonomous management of the network.

In one example, network manager 220 can provide a UE 210 in network with a SON policy to be used for detecting, logging, and reporting standardized events as illustrated by diagram 202. In another example, if UE 210 is idle prior to being provided with the SON policy, network manager 220 can initiate paging for UE 210. Additionally and/or alternatively, UE 210 can inform network manager 220 of its capability to support a SON policy (using, for example, a SON bearer and/or an associated network management protocol to be utilized with the SON policy) during an Attach procedure and/or another suitable procedure for establishing a connection between UE 210 and a network associated with network manager 220. For example, when UE 210 is initially attached via GSM EDGE (Enhanced Data rates for GSM Evolution) Radio Access Network (GERAN) and/or UMTS Terrestrial Radio Access Network (UTRAN) then subsequently moves to an Evolved UTRAN (E-UTRAN), UE 210 can provide an inter-system Tracking Area Update (TAU) message that includes SON-related UE capability information. In accordance with one aspect, a list of UEs 210 with SON capability can be gathered and maintained by network manager 220.

After a SON policy 212 has been provided by network manager 220 to UE 210, UE 210 can operate according to the SON policy 212 as illustrated by diagram 204. For example, UE 210 can include an event detector 214 to detect the occurrence of one or more standardized events defined in the SON policy 212, an event logger to log detected events and/or perform corresponding measurements in accordance with the SON policy 212, a log reporter 218 to report information relating to detected events to network manager 220 and/or another suitable entity according to a schedule provided in the SON policy 212, and/or other appropriate mechanisms for carrying out the SON policy 212. In accordance with one aspect, network manager 220 can utilize a network optimizer module 224 and/or any other appropriate means upon receiving reports of logged events from UE 210 to optimize the performance of the network based on the received reports without requiring manual testing or measurements.

Figure 3:
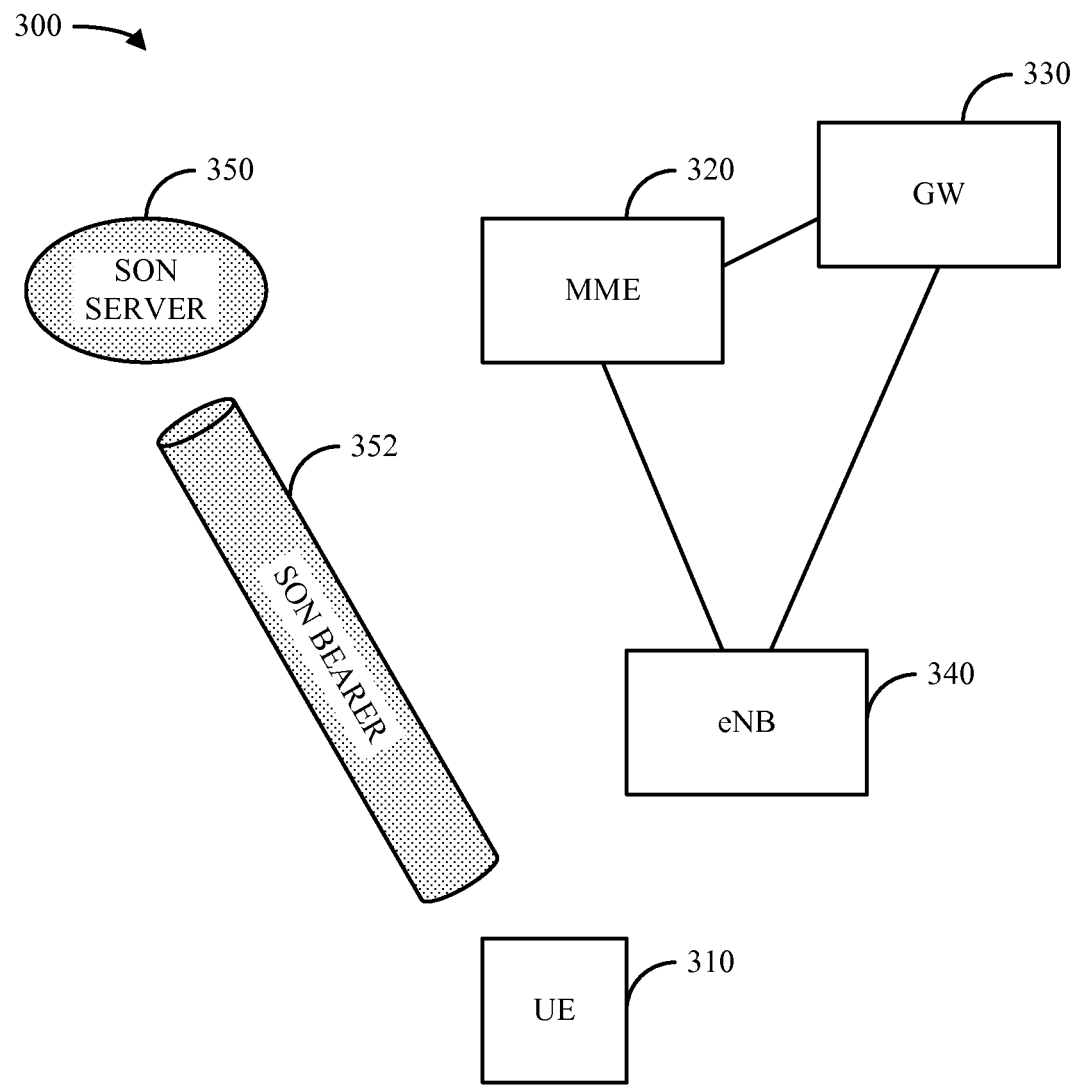
FIGS. 3-4 illustrate example implementations of a Self Organized Network in accordance with various aspects.

Turning to FIG. 3, a diagram 300 is provided that illustrates an example implementation of a Self Organized Network in accordance with various aspects. As diagram 300 illustrates, a UE 310 can interact with a network that includes a MME 320, a gateway (GW) 330, an eNB 340, a SON server 350, and/or any other suitable entities. In one example, MME 320 can track movement of a UE 310 throughout the network, initiate paging for UE 310, and/or perform other suitable actions. In another example, GW 330 can serve as a connecting point between UE 310 and one or more data networks with which UE 310 can communicate. Additionally and/or alternatively, GW 330 can route data between one or more data networks and UE 310. In an additional example, eNB 340 can provide basic communication functionality for UE 310 by, for example, scheduling resources to be used for transmission by UE 310, performing power control for UE 310, acting as a liaison between UE 310 and other entities in the network (e.g., MME 320, GW 330, or the like), and/or performing other appropriate actions.

In accordance with one aspect, SON server 350 can be utilized to implement self-organized network management within the network illustrated by diagram 300. For example, SON server 350 can specify all or part of a SON policy to be utilized by UE 310 (e.g., standardized events, techniques for logging events, techniques for reporting events, etc.). In one example, SON server 350 can be implemented in conjunction with an operations and management (O&M) system within the network illustrated by diagram 300. In another example, SON server 350 can maintain a list of UEs 310 in an associated network that have SON capability.

In accordance with another aspect, SON server 350 can relay information relating to a SON policy for UE 310 and/or other information to UE 310 via a SON bearer 352. In the example implementation illustrated by diagram 300, SON bearer 352 can be provided as a direct logical interface between UE 310 and SON server 350. In one example, SON bearer 352 can also be utilized by UE 310 to relay event reports and/or other suitable information back to SON server 350.

Figure 4:
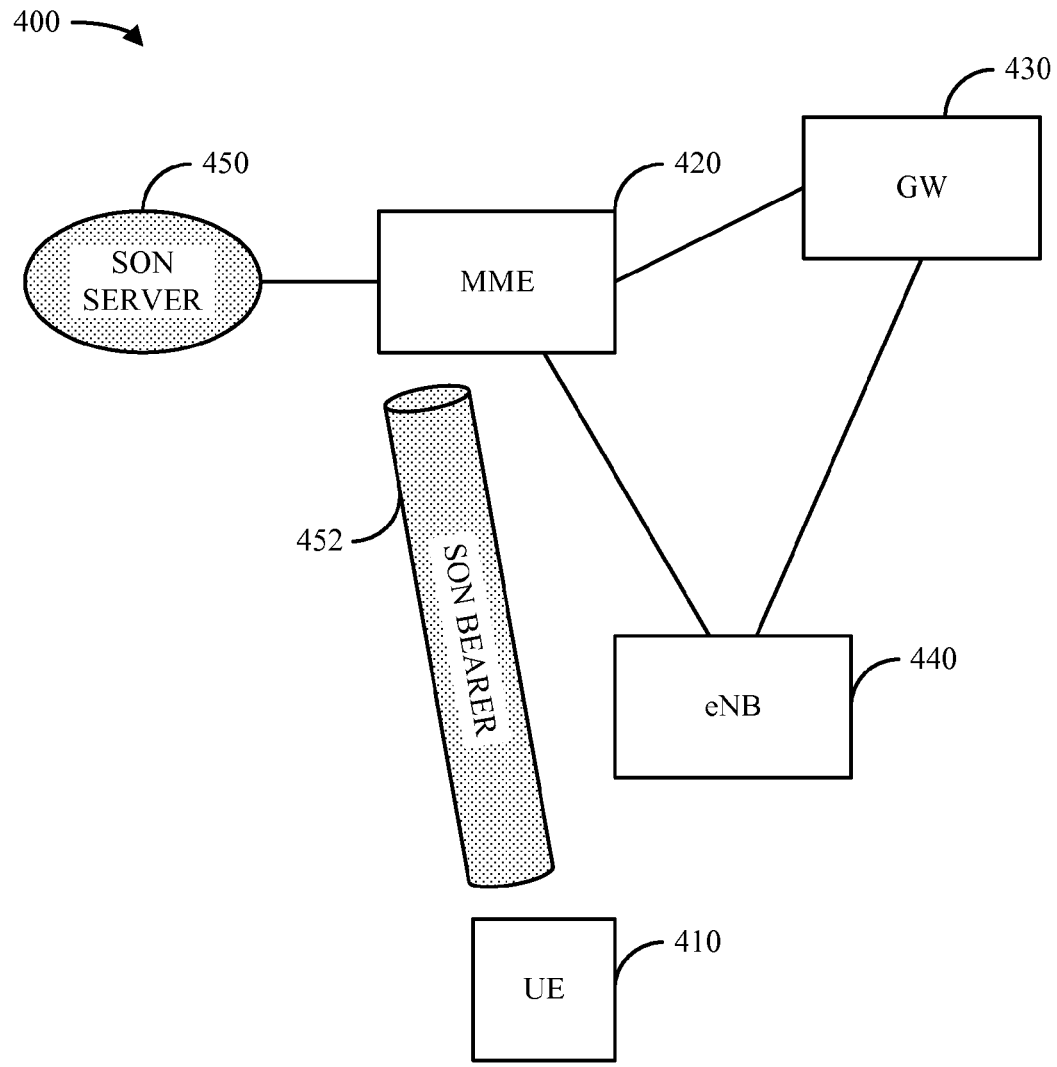

An alternative example implementation of a Self Organized Network is illustrated by diagram 400 in FIG. 4. In accordance with one aspect, the network illustrated by diagram 400 can include a UE 410, a MME 420, a GW 430, an eNB 440, and/or a SON server 450, which can perform in a similar manner to the corresponding entities in the network illustrated by diagram 300. In accordance with one aspect, MME 420 can interface with SON server 450 via any suitable wired and/or wireless communication method to obtain SON policy information from SON server 450, which can subsequently be relayed to UE 410 via a SON bearer 452 between MME 420 and UE 410. In response, UE 410 can provide information relating to events logged according to the SON policy and/or other suitable information to MME 420 via the SON bearer 452. Upon receiving such information, the information can be relayed by MME 420 to SON server 450.

Figure 5:
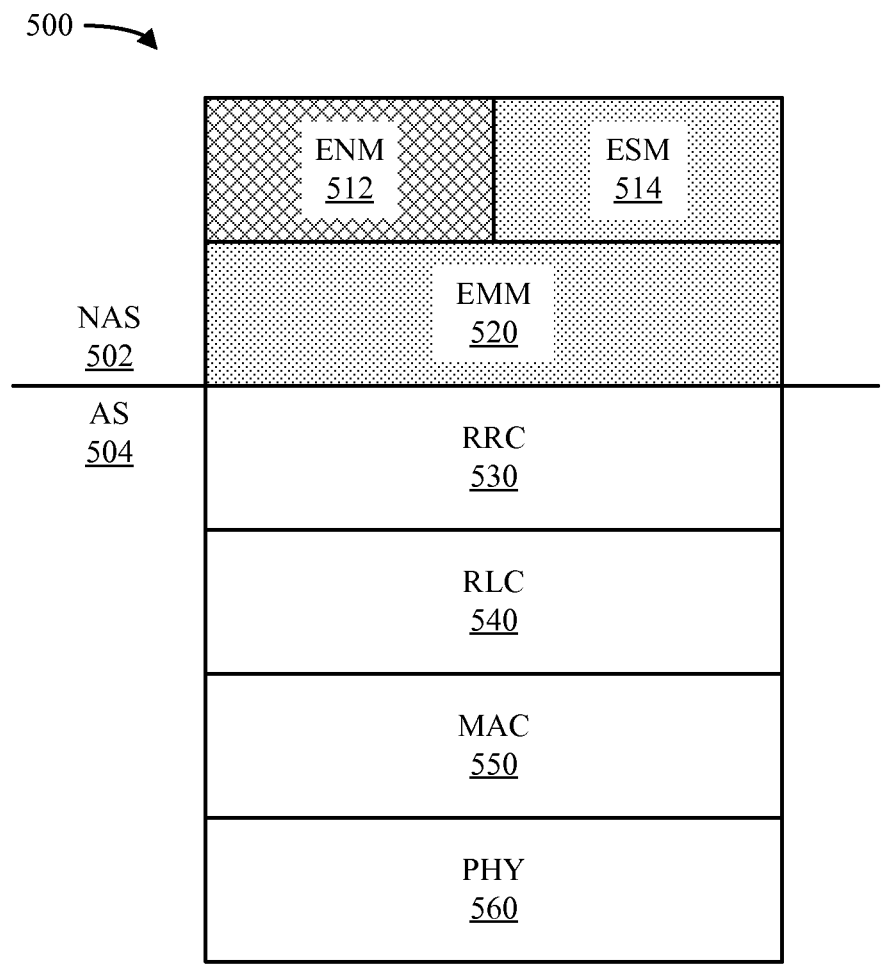
FIG. 5 illustrates an example communication protocol architecture that can be utilized to implement various aspects described herein.

In accordance with one aspect, SON bearer 452 can be implemented as a control plane-based bearer using Non-Access Stratum (NAS) signaling between UE 410 and MME 420. In one example, a control plane-based SON bearer 452 can be implemented by modifying a protocol stack utilized by the network illustrated by diagram 400 to include a protocol for network management signaling. An example of a protocol stack that can be utilized for this purpose is illustrated by diagram 500 in FIG. 5.

As diagram 500 illustrates, a protocol stack utilized by a network can include one or more NAS signaling protocols 502 and/or one or more Access Stratum (AS) signaling protocols 504. NAS signaling protocols 502 can include, for example, an EPS (Evolved Packet System) Session Management (ESM) protocol 512 and/or an EPS Mobility Management (EMM) protocol 520. AS signaling protocols 504 can include, for example, a Radio Resource Control (RRC) protocol 530, a Radio Link Control (RLC) protocol 540, a Media Access Control (MAC) protocol 550, and/or a Physical Layer (PHY) protocol 560.

As further illustrated by diagram 500, a protocol stack can be extended to include an EPS Network Management (ENM) protocol 512, which can be utilized to exchange SON related information between a UE and MME (e.g., to implement SON bearer 452 between UE 410 and MME 420). In one example, the ENM protocol 512 can be defined to reside above and utilize existing functions of the EMM protocol 520 in a similar manner to the ESM protocol 514.

As an alternative example to the network implementations illustrated by diagrams 300-400, a SON bearer can be implemented as a user plane-based bearer between a UE and a Packet Data Network (PDN) GW. This can be implemented by, for example, utilizing an Internet Protocol (IP) bearer between the UE and PDN GW such that interaction between the UE and the SON server is regarded as an IP application function. In accordance with one aspect, a PDN GW in such an implementation can coordinate with one or more other GW nodes to provide SON functionality for a UE that leaves the local area associated with the PDN GW. Additionally and/or alternatively, one or more security measures can be implemented between the UE and the SON server to secure communication between the UE and SON server via the PDN GW. Further, one or more specifications generally known in the art, such as the Open Mobile Alliance (OMA) Device Management (DM) specification and/or any other suitable specification, can be utilized to set up and/or maintain a user plane bearer between a UE and a PDN GW and/or another suitable network entity.

Figure 6:
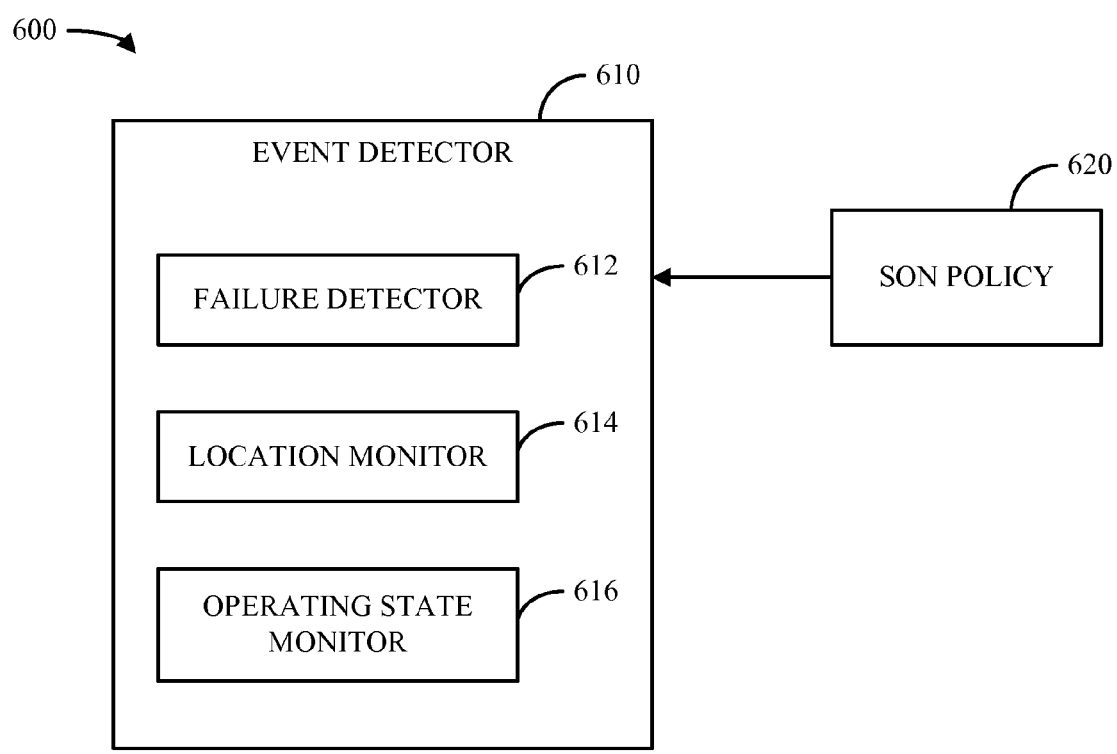
FIG. 6 is a block diagram of a system for detecting network events in accordance with various aspects.
Figure 7:
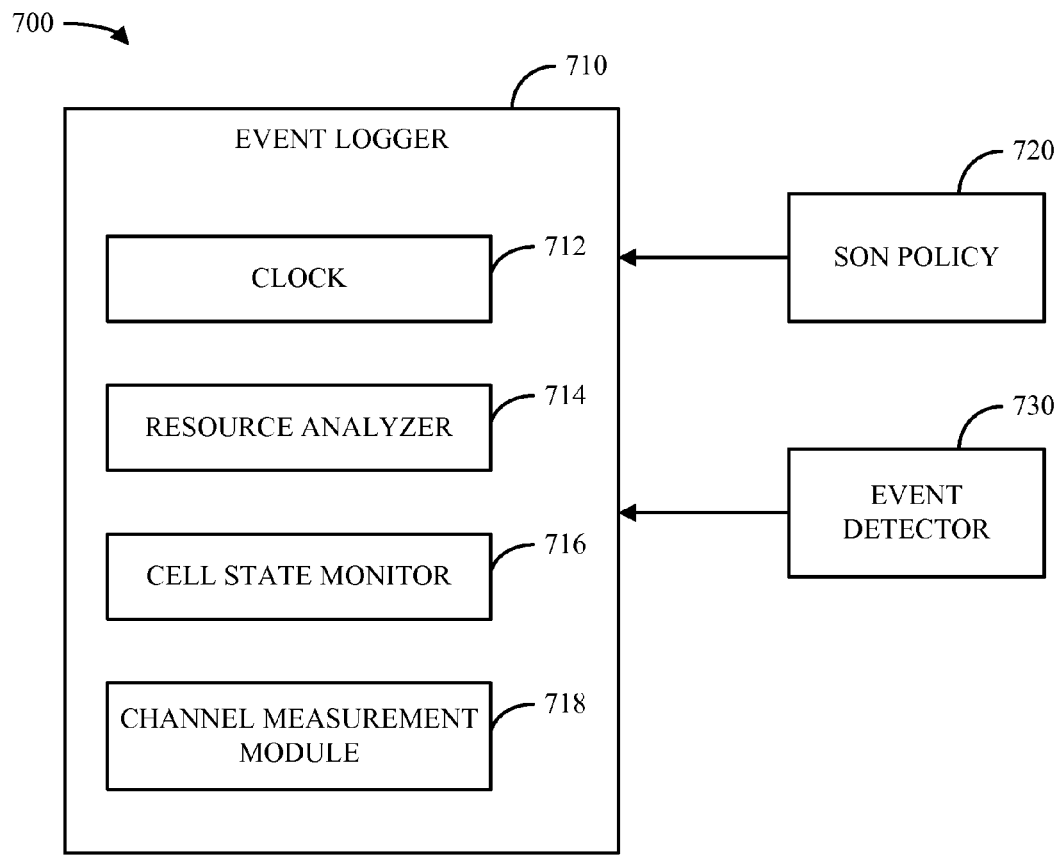
FIG. 7 is a block diagram of a system for measuring network parameters and logging network events in accordance with various aspects.
Figure 8:
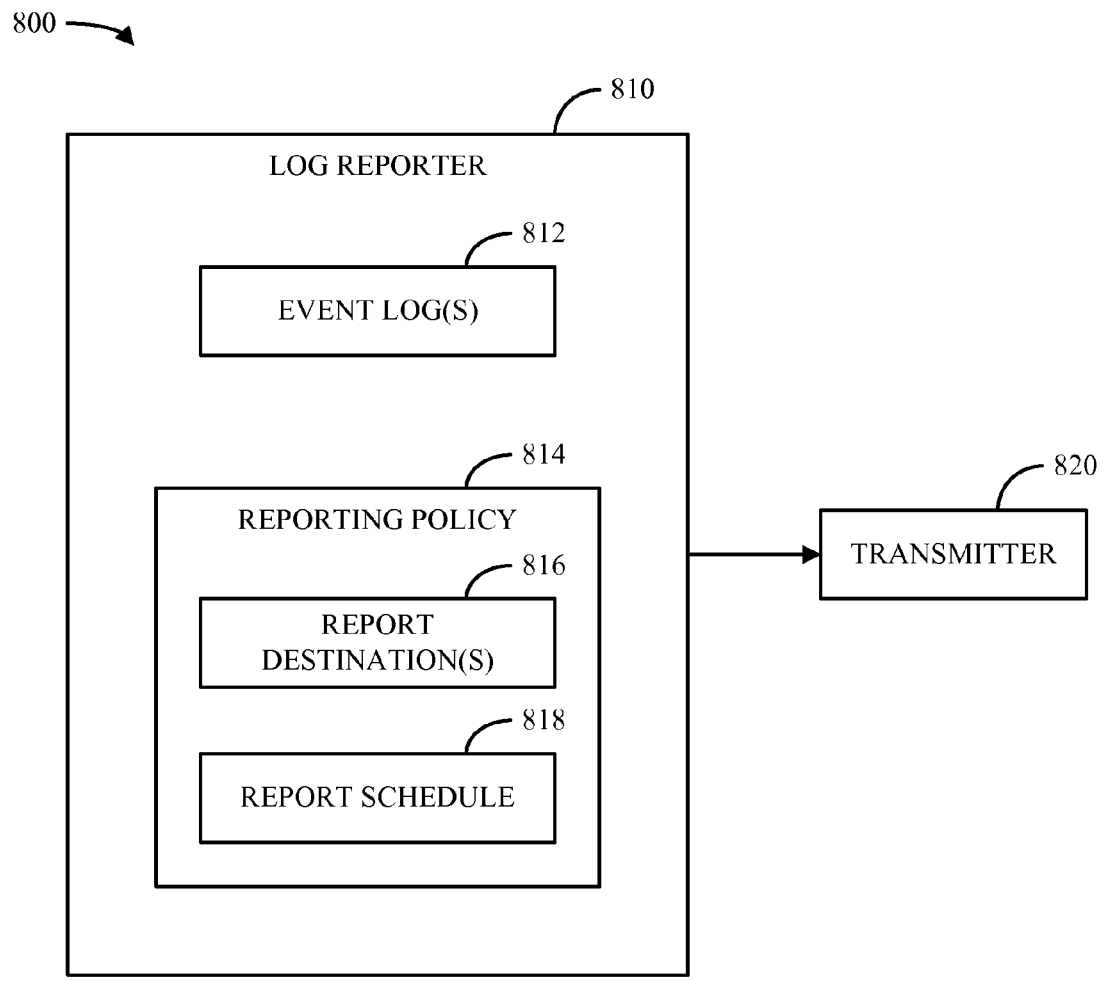
FIG. 8 is a block diagram of a system for reporting observed events to a network in accordance with various aspects.

Turning now to FIGS. 6-8, various systems that can be utilized by a network device (e.g., a UE 210) to log and report network events in accordance with a SON policy are illustrated. It can be appreciated that a network device can, in accordance with various aspects described herein, utilize one or more of the illustrated systems and/or any other suitable system(s) to facilitate operation according to a SON policy.

With specific reference to FIG. 6, a block diagram of a system 600 for detecting network events is illustrated. As FIG. 6 illustrates, system 600 can include an event detector 610, which can detect one or more events that occur in an associated network. In one example, events can be defined by a SON policy 620 and/or another suitable set of definitions. It is to be appreciated that event detector 610 can be associated with a device in a network (e.g., UE 210), or alternatively event detector 610 can be a stand-alone entity in a communication network.

In accordance with one aspect, event detector 610 can include one or more modules 612-616 for facilitating detection of various types of events. For example, event detector 610 can include a failure detector 612 for detecting failures associated with a network and/or devices in a network, such as radio link failures, connection failures, hardware failures, or the like. As another example, event detector 610 can include a location monitor 614, which can monitor the location of system 600 and/or an associated device within a network and any changes to the monitored location (e.g., movement of an associated device between cells and/or networks). Event detector 610 can additionally and/or alternatively include an operating state monitor 616, which can monitor transmission resources (e.g., resources in frequency, code, etc.), transmit power, observed interference, and/or other operation parameters associated with a network device and/or changes to such parameters.

In accordance with another aspect, when event detector 610 detects, via modules 612-616 or otherwise, an event defined by SON policy 620 and/or another suitable set of event definitions, logging can be triggered for the detected event. In one example, a system 700 for logging a detected event is illustrated by FIG. 7. As illustrated by FIG. 7, system 700 can include an event logger 710, which can measure and/or otherwise obtain information relating to the state of an associated device and/or network upon the occurrence of an event detected by event detector 730. In one example, events identified by event detector 730 can be based on a list of standardized events provided by SON policy 720 and/or another suitable set of event definitions.

In accordance with one aspect, event detector 710 can include one or more modules 712-718 for performing various measurements and/or observations associated with the operating state of an associated device and/or network at or near (e.g., preceding and/or following) the time of an event. For example, event logger 710 can include a clock 712 for determining the time of an event and generating timestamp information and/or other related information; a resource analyzer 714 for determining transmission resources, power settings, or the like, that are used by an associated device at or near the time of an event; a cell state monitor 716 for determining a serving cell for an associated device at the time of an event, a prior and/or target cell or network in the case of an associated device moving from one cell and/or network to another cell and/or network, or any other suitable information; a channel measurement module 718 for determining signal quality, observed interference, and/or other channel measurements at the time of an event and/or a time preceding or following an event; and/or any other suitable module.

In one example, event logger 710 can utilize information measured and/or otherwise obtained in association with an event to generate a report corresponding to the event. By way of specific, non-limiting example, event logger 710 can generate a report for a radio link failure (RLF) event that includes a timestamp corresponding to a time of the event, position information for an associated device if available, an identity of a current serving cell for the associated device, identities of one or more target cells to be utilized in the case of connection re-establishment in one or more frequencies or radio access technologies (RATs), channel measurements for a predetermined period of time prior to the RLF event, and/or other suitable information.

In accordance with one aspect, once one or more reports have been generated for a network event by event logger 710, the report(s) can be provided to the network for diagnostic and optimization purposes. An example system 800 for reporting observed events to a network in accordance with various aspects described herein is illustrated in FIG. 8. As illustrated by FIG. 8, system 800 can include a log reporter 810, which can facilitate reporting of one or more event logs 812 generated in accordance with a reporting policy 814 to one or more network entities via a transmitter 820 and/or other suitable means.

In accordance with another aspect, reporting policy 814 can be implemented based on a SON policy (e.g., SON policy 212), which can be provided to log reporter 810 and/or a device associated with log reporter 810. In one example, reporting policy 814 can specify one or more details regarding the manner in which event log(s) 812 are to be reported to the network. For example, reporting policy 814 can include a list of report destinations 816, which can specify network entities to which log reporter 810 is instructed to provide event log(s) 812. Report destinations 816 can include, for example, a SON server, a network gateway, an eNB, a MME, and/or any other suitable entity. In a specific, non-limiting example, the list of report destinations 816 can specify a single destination, based on which log reporter 810 can provide reports (e.g., over a SON bearer 352 and/or 452) to the specified destination. Subsequently, the destination entity can provide reports to other network entities via backhaul communication or the like as necessary within the network.

Additionally and/or alternatively, reporting policy 814 can include a reporting schedule 818, which can specify one or more instances in time at which reports are to be provided by log reporter 810. For example, reports can be scheduled to occur at regularly scheduled intervals, such as regular time intervals (e.g., once per day, once per hour, etc.) or time intervals based on normal network loading patterns (e.g., during periods of relatively low network loading, such as late night or early morning). Alternatively, reporting schedule 818 can specify that reporting is to occur at irregular intervals. For example, reporting schedule 818 can provide for reporting of event log(s) 812 in response to paging requests from the network, following events that trigger the generation of corresponding event logs 812, open explicit requests for reporting by one or more destination network entities, or the like. In another example, reports can be scheduled to occur when a register and/or other memory at the UE configured for storing measurement logs becomes full or nearly full.

Figure 9:
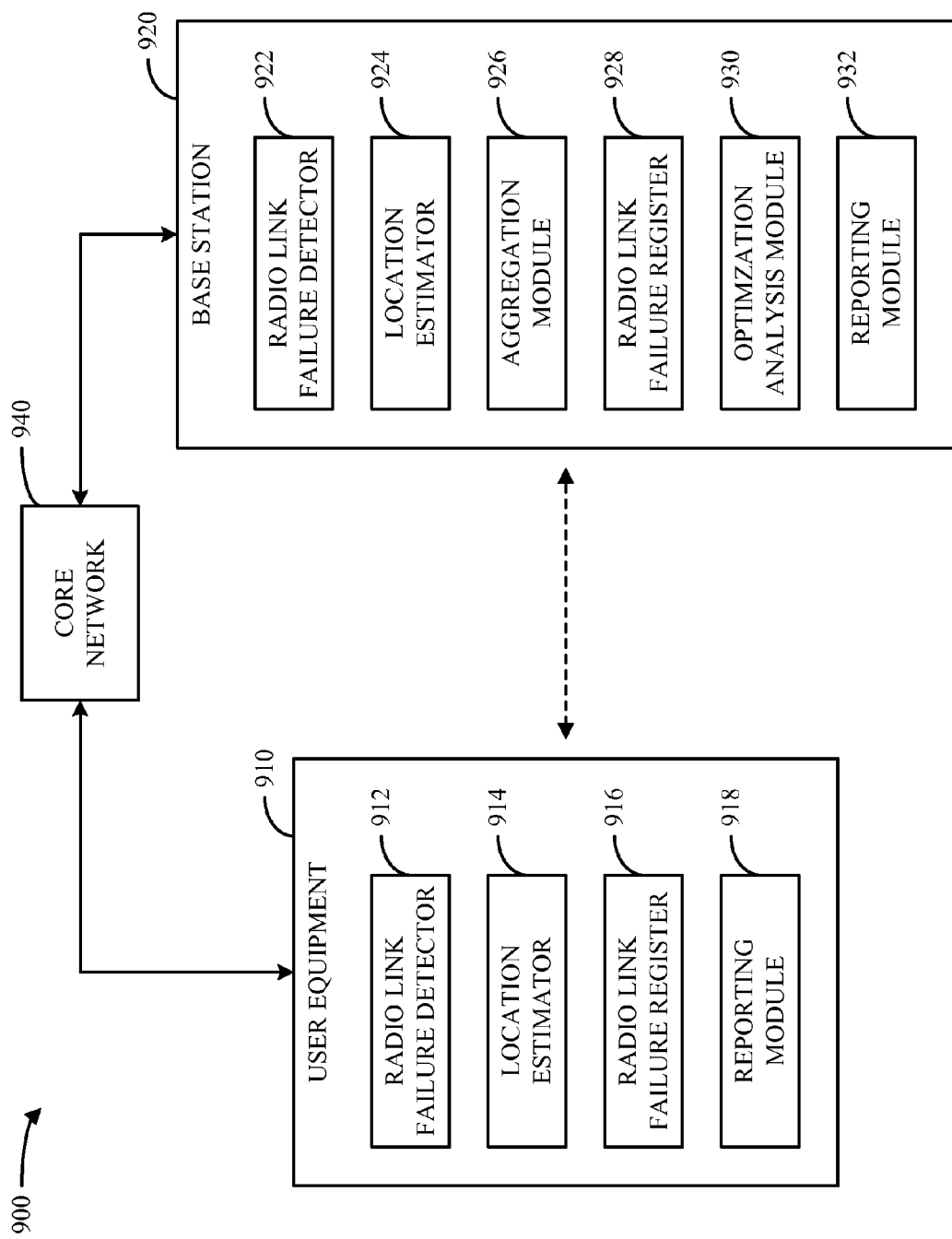
FIG. 9 is a block diagram of a system for detecting, logging, and reporting radio link failure events in a wireless communication system in accordance with various aspects.

Turning now to FIG. 9, a block diagram of a system 900 for detecting, logging, and reporting radio link failure events in a wireless communication system in accordance with various aspects is illustrated. In one example, system 900 can include a UE 910, which can communicate with a base station 920. While only one UE 910 and one base station 920 are illustrated in system 900, it should be appreciated that system 900 can include any suitable number of UEs 910 and/or base stations 920. Further, it should be appreciated that UEs 910 and/or base stations 920 in system 900 can communicate with any other suitable entities in system 900 not illustrated by FIG. 9. In one example, system 900 can further include a core network 940 that can include a MME (e.g., MME 320 or 420), a SON server (e.g., SON server 350 or 450), an operations and management (O&M) entity, and/or one or more other entities to facilitate self-optimization and/or self-healing of system 900 as generally described herein.

In accordance with one aspect, UE 910 can include a RLF detector 912, which can be used to detect RLF events such as, for example, dropped calls, handover failures, failures to establish new calls, or the like. In one example, UE 910 can further include a location estimator 914 that can determine the location of UE 910 at the time of a detected failure and generate corresponding location information. Location estimator 914 can employ one or more techniques for determining location of UE 910, which can include, but are not limited to, satellite-based technology (e.g., global positioning system (GPS)), network-based mechanisms, a hybrid of network-based and satellite-based mechanisms, and/or any other technique(s). In another example, UE 910 can include a RLF register 916, which can be utilized to retain information relating to one or more failure events and corresponding location information.

Similarly, base station 920 (and/or one or more entities in core network 940) can include a RLF detector 922, which can detect radio link failures with at least one mobile device such as UE 910. Base station 920 can further include a location estimator 924 that can facilitate determining location information associated with at least one mobile device upon detection of a RLF event. Further, upon detecting a RLF event and/or determining location information, an aggregation module 926 at base station 920 can aggregate event and/or location information generated at base station 920 corresponding to a given RLF event with information related to the RLF event received from one or more UEs 910. Information generated by RLF detector 922 and/or location estimator 924, and/or information aggregated by aggregation module 926, can subsequently be stored at a RLF register 928.

In one example, base station 920 can further include an optimization analysis module 930 that can determine if network optimization(s) would be beneficial to one or more mobile devices in a serving area of base station 920. For example, optimization analysis module 930 can determine if a neighbor list associated with base station 920 should be optimized, calculate the benefit of adding a new base station (e.g., due to RLF events caused by lack of network capacity) and/or repeater (e.g., due to RLF events caused by poor signal quality), and/or perform other suitable actions. In another example, base station 920 can include a reporting module 932 that can report aggregated event and location information stored by RLF register 928 and/or optimization analysis results generated by optimization analysis module 930 to core network 940 to facilitate network optimization and planning.

As provided in FIG. 9 and the above description, modules 922-932 can be located at and/or otherwise associated with base station 920. However, it should be appreciated that said modules 922-932 could additionally or alternatively be implemented by one or more nodes in core network 940 (e.g., a SON server, an O&M entity, and/or any other suitable core network node). As an example, optimization analysis module 930 can be associated with one or more entities in core network 940 and can operate on information obtained from UEs 910 and/or base stations 920.

In accordance with one aspect, UE 910 and base station 920 can cooperate to detect and report information relating to one or more RLF events. More particularly, UE 910 (via RLF detector 912 and/or location estimator 914) and/or base station 920 (via RLF detector 922 and/or location estimator 924) can cooperatively record information relating to an RLF event and provide recorded information to core network 940 in varying degrees.

In a first example of the above, a UE 910, upon detecting a RLF event, can be configured to record all information relating to the event, such as a timestamp of the RLF event, position of UE 910 if available, the identity of a serving cell, the identity of a target cell in cases involving radio link re-establishment, a target inter-radio access technology (RAT) or inter-frequency cell in cases where UE 910 re-enters the service area in another RAT and/or frequency, channel measurements prior to failure, or the like. In the event that UE 910 re-enters the service area in a new RAT or frequency, the time at which the target cell is accessed at the new RAT and/or frequency can additionally be recorded. Such information, and/or any other suitable information, can then be submitted to base station 920 (e.g., for processing by optimization and analysis module 930) and/or one or more entities in core network 940. Accordingly, in such an example, network self-optimization can be performed based on control plane signaling conducted with UE 910.

In a second example, UE 910 and base station 920 (or one or more entities within core network 940), upon detecting a RLF event, can cooperatively record and report information associated with the RLF. Thus, for example, UE 910 can record the time of the RLF event and the position of UE 910 at the time of the event, and base station 920 can record serving cell, target cell, and/or channel information in a similar manner to the measurements conducted by UE 910 as described in the first example above. However, it should be appreciated that the foregoing is merely one example of a division that can be implemented, and that UE 910 and base station 920 can record any suitable overlapping or non-overlapping sets of information. Upon recordation, base station 920 (or one or more entities in core network 940) can aggregate its recorded information (e.g., via aggregation module 928) with information relating to the event reported by a UE 910 involved in the event. Based on the aggregated information, optimizations can be performed via optimization and analysis module 930 and/or a report to core network 940 can be conducted via reporting module 932. In one example, base station 920 can perform measurements, analyze existing system settings related to UE 910, and/or perform any other suitable actions to obtain information for recording. Further, in the above example, it can be appreciated that network self-optimization can be performed based on a combination of user plane and control plane signaling conducted between UE 910, base station 920, and/or core network 940.

In a third example, base station 920 (or core network 940) can be configured to record all information relating to a RLF event involving one or more UEs 910. Thus, in such an example, RLF detector 922 and/or location estimator 924 can be utilized to perform one or more measurements that are similar to those performed by UE 910 as described in the first example above. In one example, aggregation module 926 can be configured to obtain one or more timestamp reports and/or other RLF event reports from respective affected UEs 910, which can be utilized by base station 920 to augment and/or confirm its recorded information. Accordingly, in such an example, it can be appreciated that network self-optimization can be performed based on IP signaling between base station 920 and core network 940 and/or user plane signaling for UE 910.

In accordance with another aspect, a reporting module 918 at UE 910 can generate a report of one or more RLF events based on data retained by RLF register 916. In one example, reporting module 918 can provide event information to base station 920, core network 940, and/or any other suitable entity. Further, such information can be provided upon request by base station 920 or one or more entities in core network 940 (e.g., an O&M center, a SON server, etc.), on a periodic basis, upon triggering of one or more predefined events (e.g., RLF register 918 becoming full, the associated radio link becoming operational, etc.), and/or at any other suitable time. In one example, UE 910 and/or base station 920 can be configured to provide periodic reports to each other and/or to core network 940 based on a variable reporting period. Thus, for example, a period at which UE 910 and/or base station 920 reports to core network 940, or a period at which UE 910 reports to base station 920, can be configured to be relatively short in length to require more reporting in times immediately following a change in network topology (e.g., an added or removed base station, etc.) as compared to times more distant from changes in network topology. In another example, UE 910 can be configured to utilize one or more applications and/or other mechanisms by which reporting module 918 can tunnel and/or otherwise provide data directly to one or more entities in core network 940.

Figure 10:
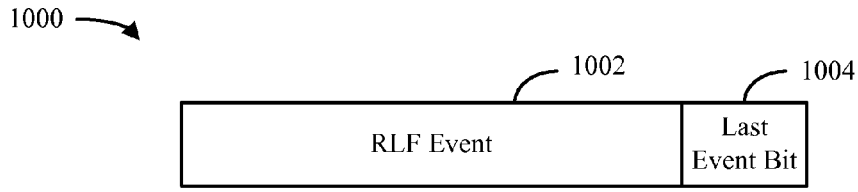
FIG. 10 illustrates an example radio link failure report structure that can be utilized in accordance with various aspects.

In another example, a format that can be utilized by reporting module 918 and/or reporting module 932 for providing RLF reports is illustrated by diagram 1000 in FIG. 10. As diagram 1000 illustrates, a report can be provided in the form of a RLF message, which can include RLF event data 1002 followed by a last event bit 1004. In one example, last event bit 1004 can be utilized to identify whether additional RLF events are to be transmitted, thereby enabling a chain of RLF event reports to be communicated in a single transmission. By way of specific example, last event bit 1004 can be set to '0' to indicate that no more RLF events follow or to '1' to indicate that additional RLF events are to follow.

Returning to FIG. 9, system 900 can, in accordance with one aspect, be utilized to facilitate RLF-based neighbor list optimization in a wireless communication network. As new technologies are deployed in connection with existing communication networks, it has been recognized that further neighbor list (NL) optimizations are desirable. Further, it can be appreciated that there is a growing trend in wireless communication technology toward SON implementations. For example, existing network implementations provide for standardized optimizations of network planning based on events such as call drops, handover failure, new call establishment failure, or the like. In such an example, network optimization can be performed periodically with other input parameters such as distance between two base stations, signal strength, planning tool data, and/or other parameters.

However, in such an approach, it can be appreciated that the network will likely not be optimized even after neighbor list optimization as, for example, there may be a need for additional repeaters and/or base stations. Further, this need may not be readily recognizable during RLF-based NL optimization due to the fact that a network may still attempt to create a new NL from existing cells and/or sectors. If a drive test is performed to verify a good radio link, it can be appreciated that there still is a probability of a suboptimal network NL, as the network optimization is based on a drive test conducted on fixed drive routes while the network as a whole extends beyond the drive routes. Accordingly, radio link issues in these areas are generally not discovered, and as a consequence the network is generally not optimized in these areas. It can be additionally appreciated that further on the drive routes, the optimized NL list may not be optimal, which can in turn lead to a requirement for second, third, etc., rounds of optimization around the same geography. In some cases, these problems can continue until a new base station or repeater is introduced.

Accordingly, to mitigate the above shortcomings of existing implementations, system 900 can enable a UE 910 to report a RLF event to an associated network (e.g., via a base station 920 and/or core network 940) along with the reason for the failure and/or the location of the failure. Base station 920 and/or core network 940 can then use this information with other network planning and optimizing information to optimize an associated neighbor list, either among existing base stations or with deployment of one or more new base stations and/or repeaters. By doing so, it can be appreciated that system 900 offers significant efficiency for self organization of an associated network. Further, it can be appreciated that system 900 offers robustness to an associated network as a UE 910 is able to report a RLF to the network with a failure reason and a failure location throughout the entire network without being limited to drive routes, thereby enabling the entire network to be optimized.

In accordance with one aspect, system 900 can operate in various manners depending on the capabilities of UE 910. More particularly, in a first specific example, UE 910 can be equipped with support for reporting location (e.g., using Assisted GPS (A-GPS), Advanced Forward Link Trilateration (AFLT), etc.) and a register that keeps record of the location of UE 910 and one or more RLF events. In such an example, when the radio link associated with UE 910 fails causing a call drop, a handover failure, or a failure to establish a new call, UE 910 can record the event in a register. Next, UE 910 can trigger a location estimation of itself using a satellite-based, network-based, and/or hybrid technology. Subsequently, as UE 910 continues to establish the radio link and is in good network health, UE 910 can keep its location and the RLF event in a register and subsequently transfer such information to base station 920. Upon receiving the transferred information, base station 920 can determine whether an immediate change in an associated neighbor list will help UEs in the area of UE 910. The result of this determination can then be provided to core network 940 for further network organization and planning.

In a second example, UE 910 can be equipped with support for reporting location (e.g., using A-GPS, AFLT, etc.), a register that keeps record of the location of UE 910 and one or more RLF events, and a timer that starts at a first RLF event and restarts at consecutive RLF events. In such an example, upon experiencing a RLF event, UE 910 can record the event and estimate location as described above. Next, UE 910 can start a timer that continues until another RLF event occurs. At the occurrence of a subsequent RLF event, UE 910 can place the location and cause of the previous failure in a buffer for transmission to base station 920. This process can subsequently be repeated until UE 910 establishes a sufficient communication link with base station 920, at which time UE 910 can report information corresponding to the recorded RLF event(s) to base station 920.

In a third example, UE 910 can be equipped with support for reporting location (e.g., using A-GPS, AFLT, etc.), a register that keeps record of the location of UE 910, and base station 920 can be equipped with a register that keeps record of one or more RLF events and their corresponding causes. In such an example, upon encountering a RLF failure, base station 920 can record the event in a register. Subsequently, UE 910 can estimate its location as generally described above. Once a communication link has been established between UE 910 and base station 920, UE 910 can transfer the estimated location information to base station 920, which can subsequently perform neighbor list optimization as generally described above.

With regard to the above examples, it should be appreciated that such examples are not intended to serve as an exhaustive list of possible implementations that can be utilized by system 900. Further, it should be appreciated that the hereto appended claims, unless explicitly stated otherwise, are not intended to be limited to one or more specific implementations.

Figure 11:
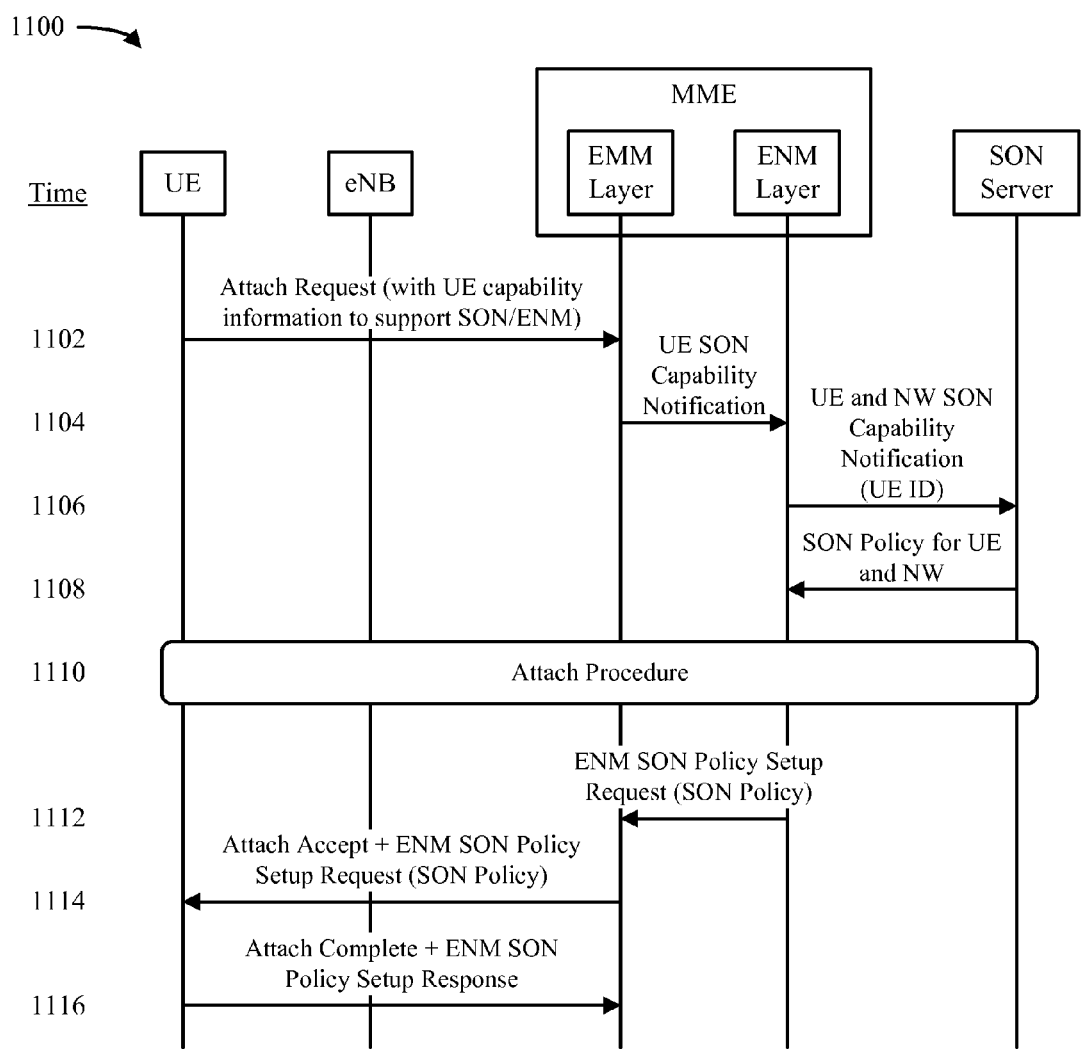
FIGS. 11-12 illustrate respective example procedures that can be utilized for providing a network management policy to a device in accordance with various aspects.
Figure 12:
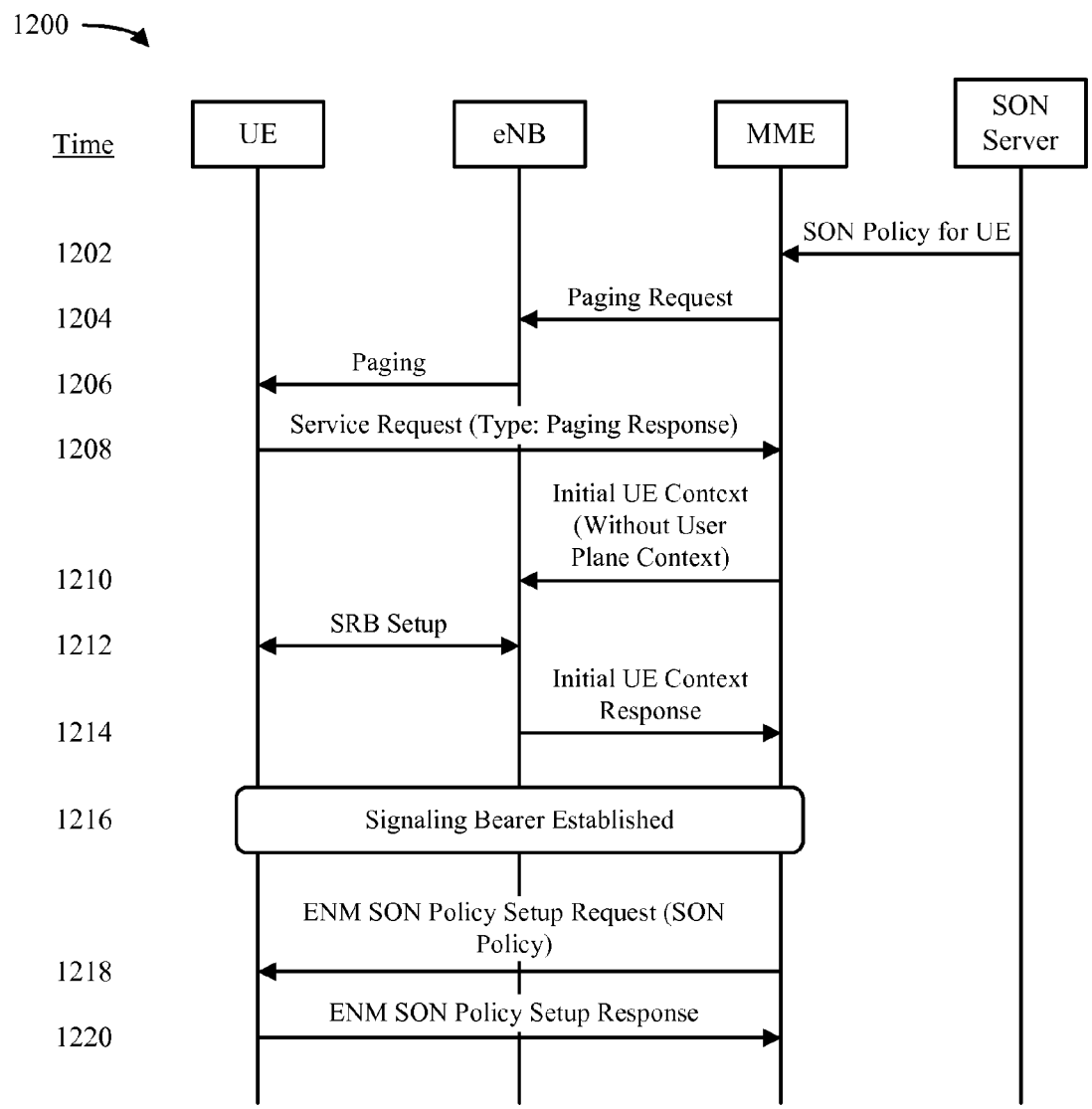
Figure 13:
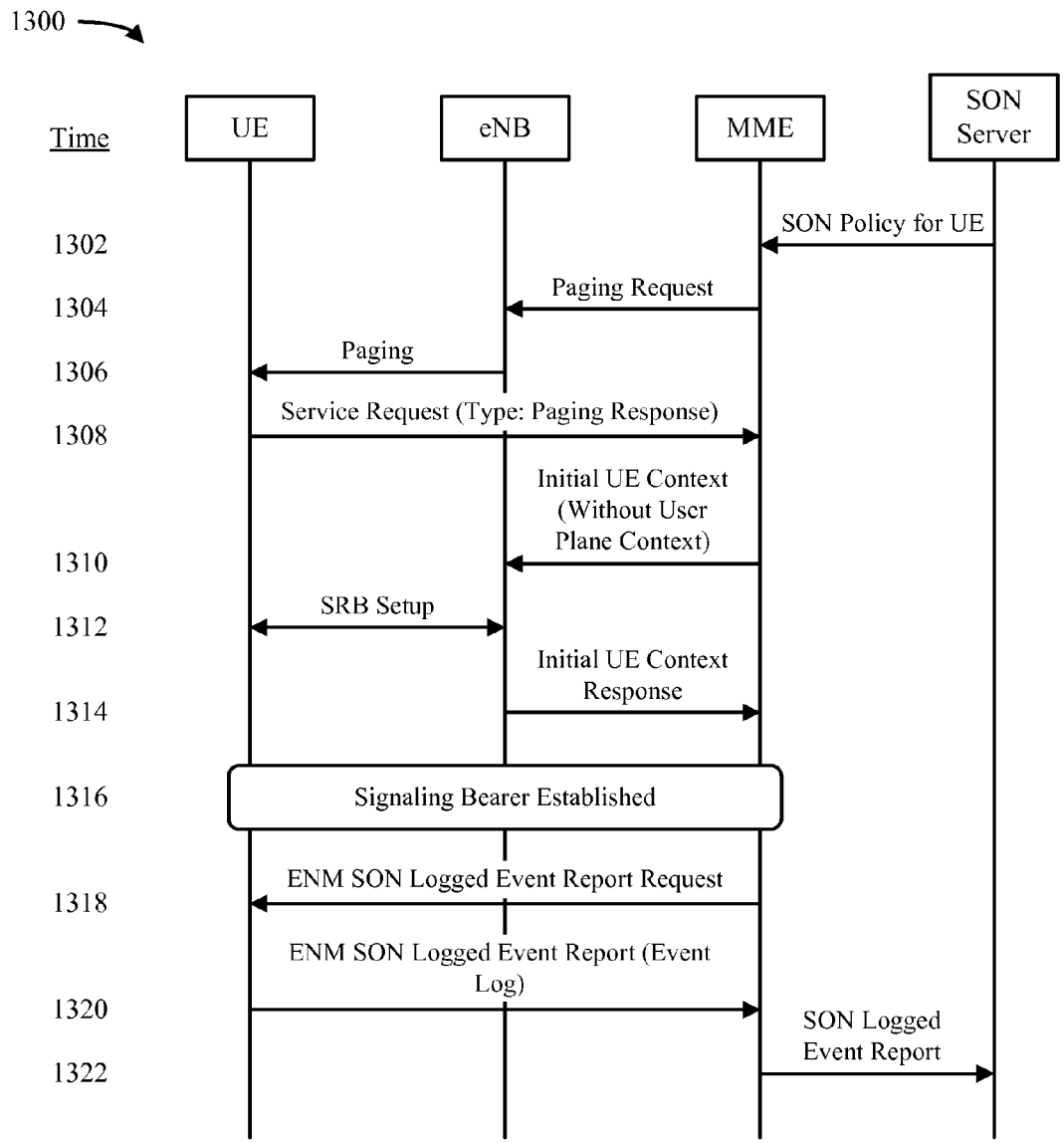
FIG. 13 illustrates an example procedure that can be utilized for providing reports according to a network management policy in accordance with various aspects.

Turning now to FIGS. 11-15, various procedures that can be implemented in accordance with various aspects described herein are illustrated. It should be appreciated, however, that the procedures illustrated by FIGS. 11-13 are provided as non-limiting examples and that any suitable procedures could be utilized in addition to, or in place of, the illustrated procedures. It should be further appreciated that any procedures that could be utilized as described herein are intended to fall within the scope of the hereto appended claims.

With specific reference to FIG. 11, a diagram 1100 that illustrates a procedure for providing a network management policy (e.g., SON policy 212) to a device (e.g., UE 210) is provided. In accordance with one aspect, the procedure illustrated by diagram 1100 can be utilized for providing a UE with a network management policy during an attach procedure utilized by the UE for establishing communication with an associated network.

As FIG. 11 illustrates, at time 1102, a UE can initiate an attach procedure with a network by communicating an Attach Request message to the EMM layer of a MME associated with the network. In one example, the Attach Request message provided by the UE at time 1102 can indicate the capability of the UE and/or network (NW) in terms of SON and/or ENM support to the network. Next, at time 1104, a notification of the capability of the UE and network for SON support can be relayed from the EMM layer at the MME to the ENM layer. This notification can in turn be provided to a SON server with the ID of the UE at time 1106. In response, at time 1108, the SON server can relay a SON policy for the UE and network to the ENM layer of the MME. Following the performance of an attach procedure between the UE and network at time 1110, the ENM layer at the MME can provide an ENM SON Policy Setup Request for the UE to the EMM layer along with the SON policy configured for the UE by the SON server at time 1112. The SON policy can subsequently be relayed to the UE by the EMM layer at the MME at time 1114 using a combined Attach Accept and ENM SON Policy Setup Request message to the UE. In response to the message at time 1114, the UE can provide an Attach Complete and ENM SON Policy Setup Response message at time 1116 to acknowledge completion of the attach procedure and confirm receipt of the SON policy.

Turning now to FIG. 12, a diagram 1200 that illustrates another procedure for providing a network management policy to a network device is illustrated. In the example illustrated by diagram 1200, an MME can convey a SON policy to a UE after a signaling connection between the UE and the network associated with the MME establish a signaling connection.

In accordance with one aspect, the procedure illustrated by diagram 1200 can begin at time 1202, wherein a SON server associated with the network provides a SON policy to be utilized by a UE to an associated MME. As diagram 1200 further illustrates, this SON policy can then be provided by the MME to a UE. In one example, if the UE is idle, the MME can page the UE to set up a signaling connection for an ENM message exchange. Accordingly, at time 1204, the MME can provide a Paging Request message to an eNB serving the UE, which in turn can page the UE at time 1206. At time 1208, the UE can respond to the paging signal received at time 1204 by submitting a Service Request message to the MME.

Subsequently, at time 1210, the MME can provide initial UE context to the eNB. In the example illustrated by diagram 1200, the UE context provided at time 1210 can omit user plane context. The eNB can utilize this information to engage in a Signaling Radio Bearer (SRB) setup process with the UE at time 1212, after which the eNB can provide an Initial UE Context Response message to the MME at time 1214. Accordingly, as illustrated at time 1216, a signaling bearer can be established between the UE and MME.

After establishment of the signaling bearer between the UE and MME at time 1216, the MME can provide an ENM SON Policy Setup Request message to the UE at time 1218. In one example, this message can specify one or more details of the SON policy to be utilized by UE (e.g., definitions of events to report, measurements to include in reports, schedules for reporting, etc.). Finally, at time 1220, the UE can acknowledge the SON policy provided by the MME at time 1218 with an ENM SON Policy Setup Response message communicated to the MME.

Referring now to FIG. 13, a diagram 1300 is provided that illustrates an example procedure that can be utilized for providing reports according to a network management policy in accordance with various aspects. In one example, when the procedure illustrated by diagram 1300 is initiated by a network for an idle UE, an MME associated with the network can page the UE to set up a signaling connection for an ENM message exchange. In accordance with one aspect, paging can occur at times 1302 through 1316 in a similar manner to the procedure illustrated by diagram 1200 at times 1202-1216. Alternatively, it can be appreciated that the procedure illustrated by diagram 1300 can be initiated in any suitable manner, such as by the UE itself based on its SON policy.

Upon the establishment of a signaling bearer between the UE and MME as illustrated at times 1302-1316, or upon any other suitable technique for initiating network management reporting from the UE to the network, the MME can submit an ENM SON Logged Event Report Request message to the UE at time 1318. In response, the UE can communicate an ENM SON Logged Event Report back to the MME at time 1320 that includes one or more requested event logs. A report of the logged event can then be provided from the MME to the SON server at time 1322.

In accordance with one aspect, the report request provided to the UE at time 1318 can specify reporting of one or more specific event logs, which can be provided from the UE to the MME at time 1320. Alternatively, the report request can more generally request reporting of some or all event logs maintained by the UE in a predetermined time period (e.g., since the last report by the UE). In one example, the report request can additionally specify one or more specific items to be included in the event log(s) that are provided by the UE at time 1320.

Figure 14:
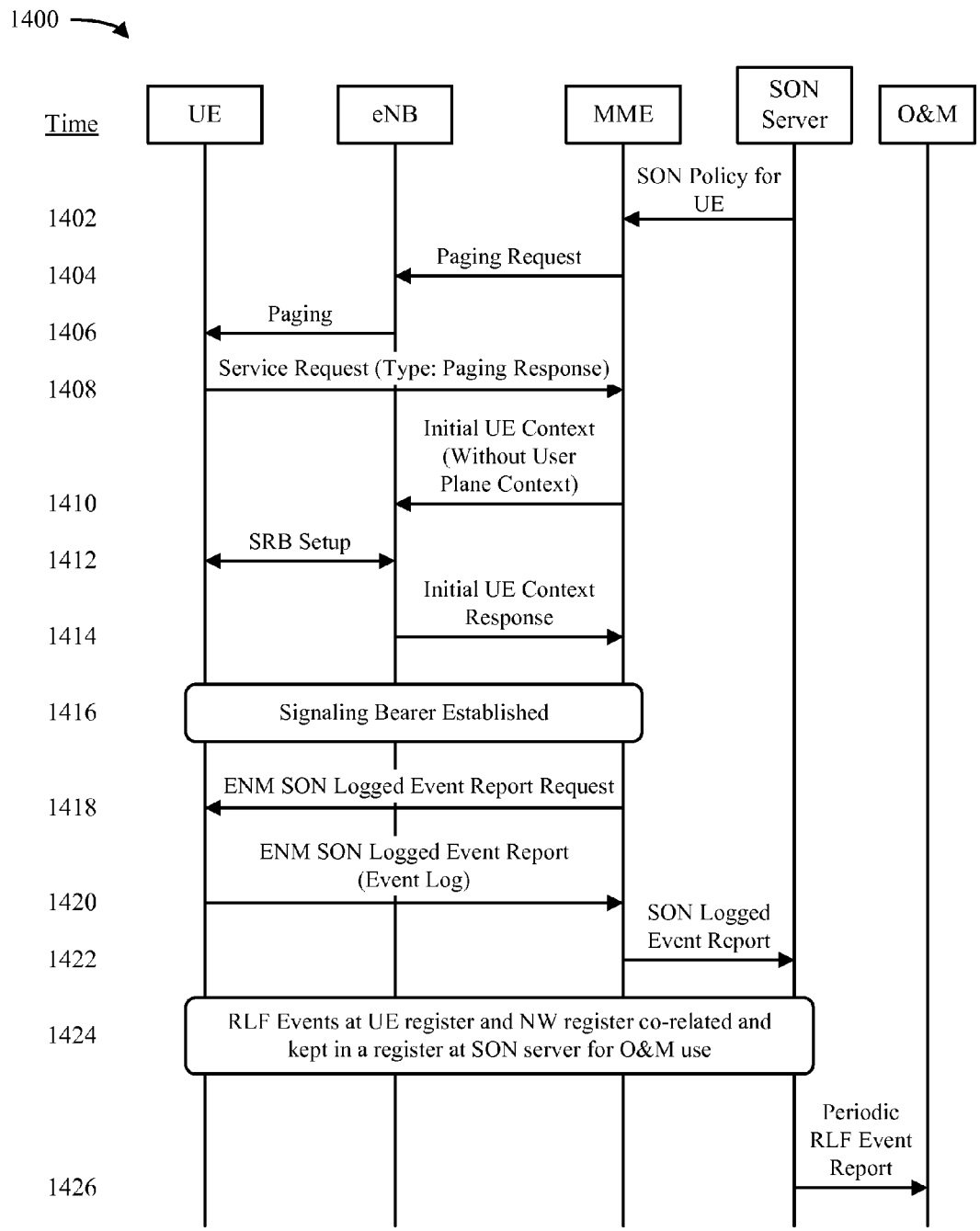
FIGS. 14-15 illustrate respective example procedures that can be utilized for providing radio link failure reports in accordance with various aspects.

Turning to FIG. 14, a diagram 1400 is provided that illustrates an example procedure for providing a RLF report to an O&M entity (e.g., associated with a core network 940). In one example, a signaling bearer can be established between a UE and an MME at times 1402-1416 in a similar manner to that illustrated by diagram 1200 at times 1202-1216. Further, a logged event report can be provided by the UE to a SON server via the MME at times 1418-1422 in a similar manner to the procedure illustrated by diagram 1300 at times 1318-1322. Upon receipt of an event report as illustrated at times 1418-1422, the network can trigger co-relation of multiple RLF events at the UE and the network at the SON server at time 1424. Subsequently, at time 1426, the SON server can report the RLF events in a message to an O&M entity on a periodic basis to evaluate the need for another eNB and/or repeater, perform neighbor list optimization, and/or conduct any other suitable action(s).

Figure 15:
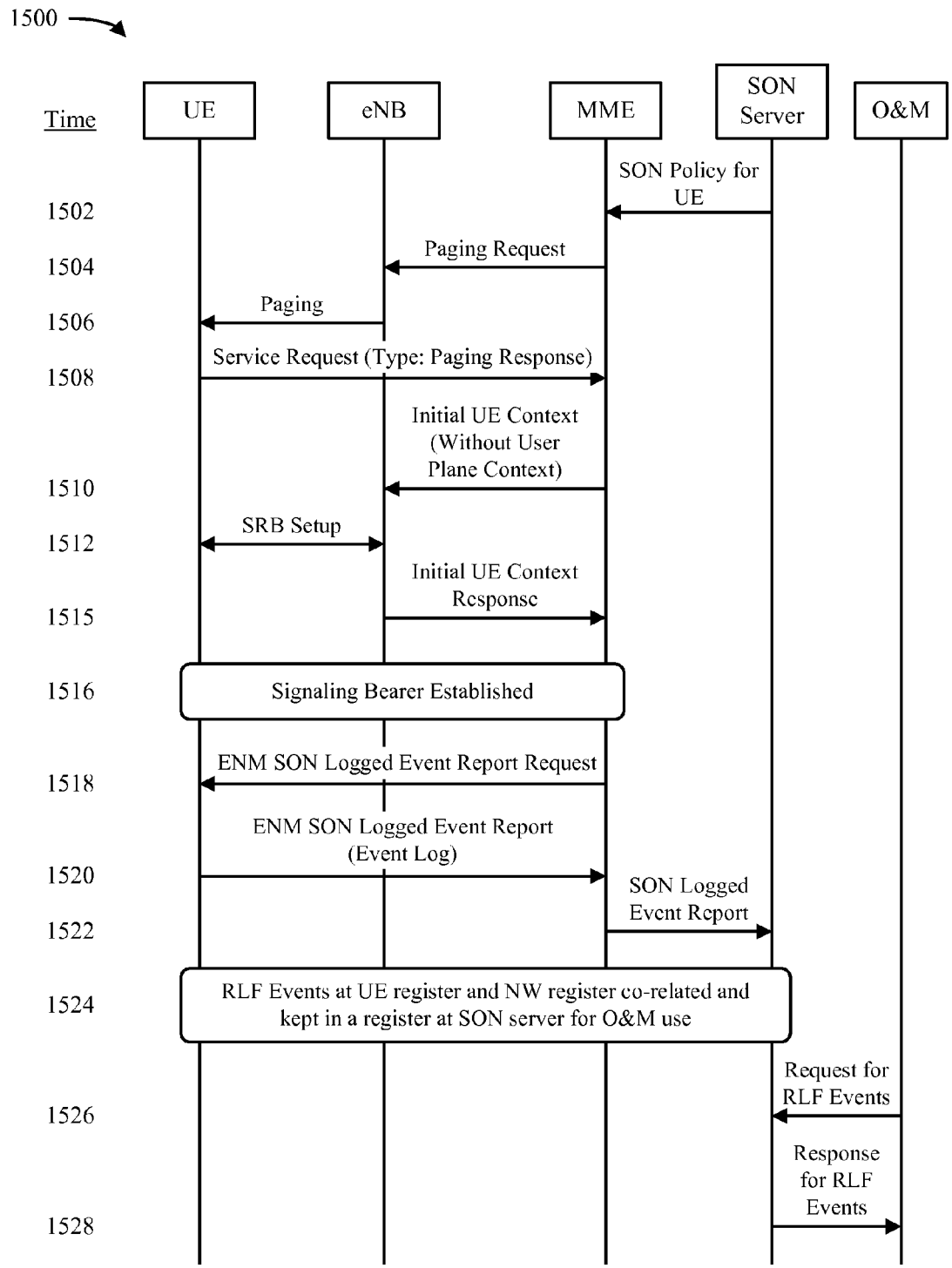

Referring next to FIG. 15, another diagram 1500 is provided that illustrates an example procedure for providing an on-demand RLF report to an O&M entity. As diagram 1500 illustrates, a signaling bearer can be established between a UE and a MME, based on which the UE can submit a logged event report to a SON server via the MME, at times 1502-1522. Next, at time 1524, the network can trigger co-relation of multiple RLF events at the UE and the network at the SON server in a similar manner to that illustrated in diagram 1400 at time 1424. Subsequently, at times 1526 and 1528, an O&M entity can utilize request messages to the SON server and response messages from the SON server, respectively, to evaluate the need for another eNB and/or repeater, perform neighbor list optimization, and/or conduct any other suitable action(s).

Figure 16:
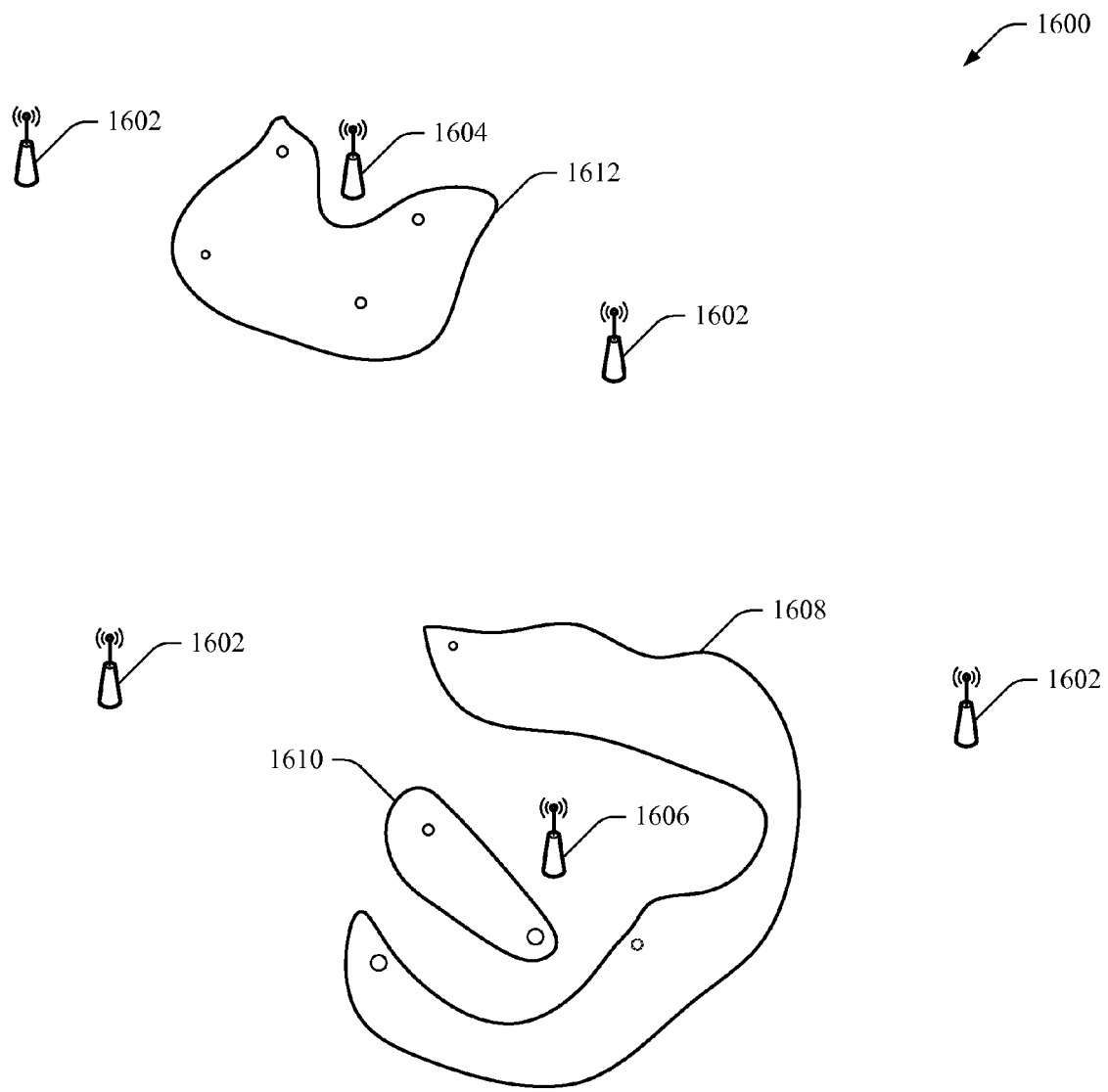
FIG. 16 illustrates an example network configuration in accordance with various aspects.

Turning to FIG. 16, a diagram 1600 is provided that illustrates an example network configuration that can be utilized in accordance with various aspects. As diagram 1600 illustrates, an example network can include one or more operating base stations 1602, which can provide coverage for respective service areas. In one example, based upon reports obtained as generally described above, it can be determined that a first grouping 1608 represents mobile device locations associated with failure to originate new calls, a second grouping 1610 represents mobile device locations associated with dropped calls, a third grouping 1612 represents mobile device locations associated with handover failures, and so on. In accordance with one aspect, information relating to groupings 1608-1612 can be utilized as the basis for a determination that a new base station 1606 and/or a new repeater 1604 are needed in the network.

Referring to FIGS. 17-22, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 17:
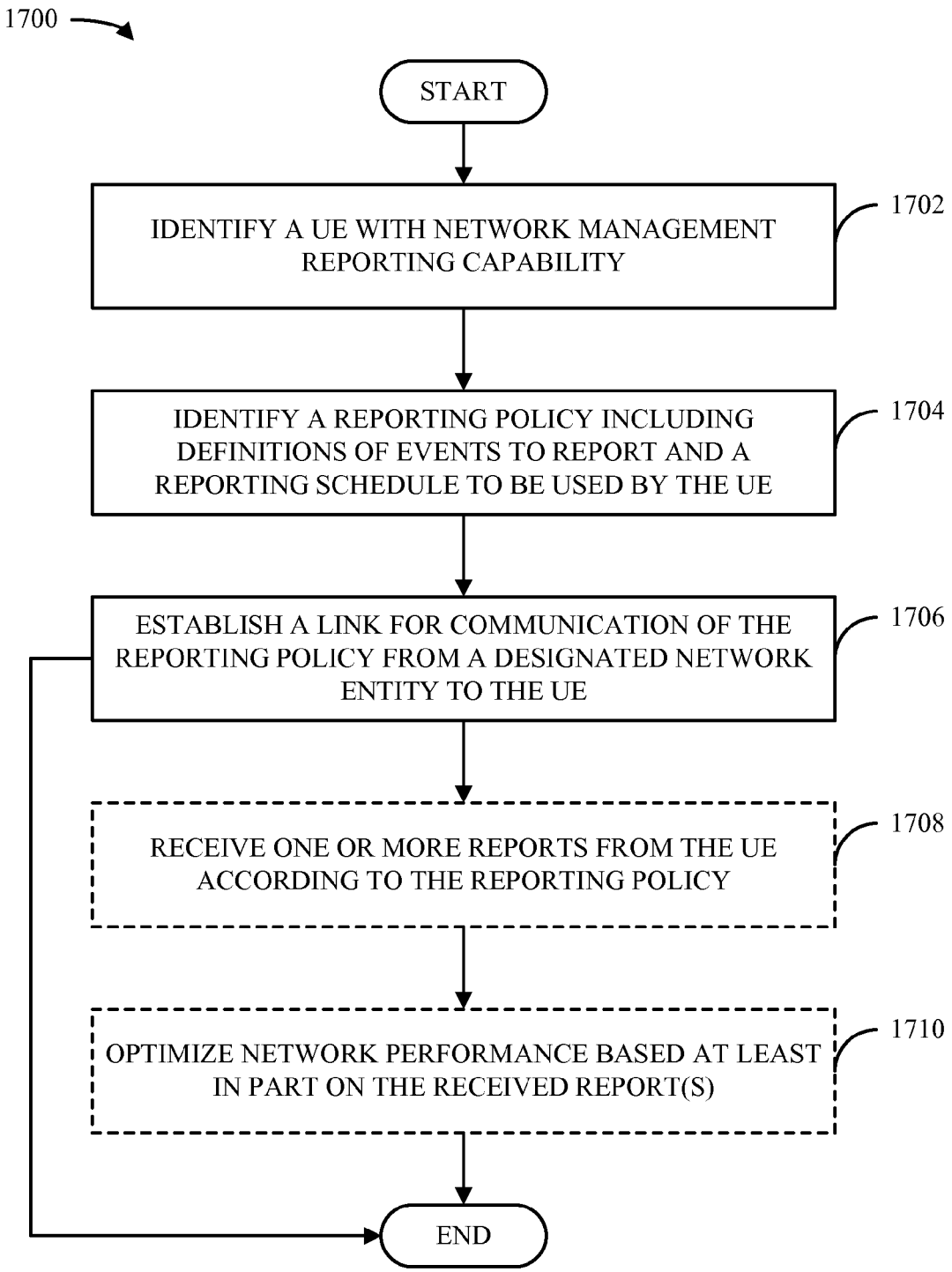
FIG. 17 is a flow diagram of a methodology for providing an event reporting policy to a device in a communication system.

With reference to FIG. 17, illustrated is a methodology 1700 for providing an event reporting policy to a device (e.g., UE 210) in a communication system (e.g., the system illustrated by diagrams 202-204). It is to be appreciated that methodology 1700 can be performed by, for example, a base station, a network controller (e.g., network manager 220) and/or any other appropriate network entity. Methodology 1700 begins at block 1702, wherein a UE with network management reporting capability is identified. In one example, a UE can be identified at block 1702 based on control signaling provided by the UE and/or past communication with the UE. Additionally and/or alternatively, network management reporting ability of a UE can be inferred from a device ID and/or other characteristics of the UE, and/or by any other appropriate means.

Next, at block 1704, a reporting policy (e.g., a SON policy 217) that includes definitions of events to report and a reporting schedule to be utilized by the UE identified at block 1702 is identified. In accordance with one aspect, events in the list of definitions can include one or more failure events (e.g., hardware failure, connection failure, RLF, etc.), one or more resource measurements (e.g., measurements of transmit power and/or other resources used by a UE), network topology information (e.g., identities of cells to which a UE is connected, home and/or visiting cells for a UE, etc.), or the like. Further, the schedule can specify one or more times for reporting logs associated with defined events, such as predetermined time intervals, time intervals based on network loading, time periods immediately or substantially immediately following logging of respective events, or the like. In one example, the reporting schedule identified at block 1704 can further include one or more diagnostic measurements to be provided in respective reports.

Upon identifying a reporting policy to be utilized by a UE at block 1704, a link for communication of the reporting policy can be established between a designated network entity to the UE at block 1706. In one example, a reporting policy can be provided to a UE at block 1706 using control-plane signaling during the establishment of a connection between the UE and a network in which methodology 1700 is performed, which can be accomplished via an attach procedure, a paging procedure, and/or another suitable technique. Alternatively, it can be appreciated that a reporting policy can be provided to a UE at block 1706 at any other appropriate time. As another alternative, a gateway node and/or another suitable network entity can be designated at block 1706 to provide the reporting policy to the UE using a user-plane bearer between the designated network entity and the UE. In one example, a bearer can be established between a network entity designated at block 1706 and a UE such that the designated network entity and the UE can interact via one or more IP application functions.

Upon completing the acts described at blocks 1702-1706, methodology 1700 can conclude. Alternatively, methodology 1700 can optionally proceed to block 1708, wherein one or more reports are received from the UE to which a link for providing the reporting policy was established at block 1706 according to said reporting policy. Methodology 1700 can then conclude at block 1710, wherein network performance is optimized based at least in part on report(s) received at block 1708. Optimization at block 1710 can include, for example, adjustments to rate, coding, power, and/or other parameters utilized for communication with the UE in order to reduce the occurrence of failures logged by the UE. As another example, optimization at block 1710 can include control of transmit power and/or resources in frequency, time, code, or the like in order to mitigate the effects of interference in a network in which methodology 1700 is performed. In addition, it is to be appreciated that any other suitable optimizations could be performed at block 1710.

Figure 18:
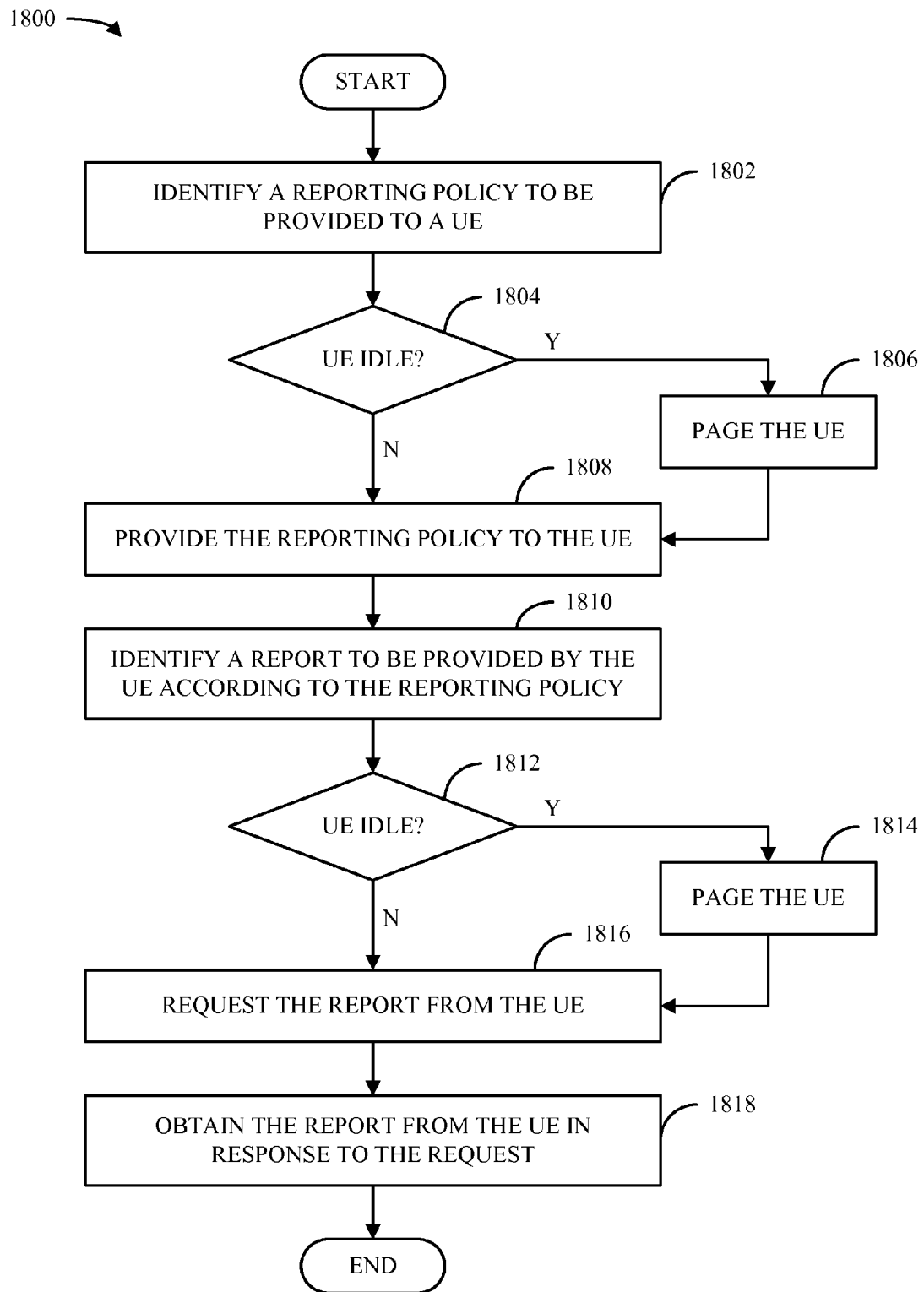
FIG. 18 is a flow diagram of a methodology for managing a network reporting procedure.

FIG. 18 illustrates a methodology 1800 for managing a network reporting procedure. Methodology 1800 can be performed by, for example, an access point, a network management entity, and/or any other appropriate network device. Methodology 1800 begins at block 1802, wherein a reporting policy to be provided to a UE is identified. Next, at block 1804, it is determined whether the UE is idle. If the UE is idle, a paging procedure (e.g., a paging procedure as illustrated by diagram 1000) can be utilized at block 1806 to page the UE. Upon completion of paging at block 1806, or upon determining at block 1804 that the UE is not idle, methodology 1800 can proceed to block 1808, wherein the reporting policy identified at block 1802 is provided to the UE. In one example, paging at block 1806 and communication of a reporting policy at block 1808 can be combined into a single action upon determining at block 1804 that the UE is idle.

After providing a reporting policy to the UE at block 1808, methodology 1800 can proceed to block 1810, wherein a report to be provided by the UE according to the reporting policy is identified. In one example, a specific report can be identified at block 1810 that is to be provided by the UE according to the reporting policy provided to the UE at block 1808. Alternatively, the identification at block 1810 can be more generally directed to one or more reports that are logged and/or stored by the UE at the time of identification. Methodology 1800 can then proceed to block 1812, wherein it is determined whether the UE is idle. If the UE is idle, a paging procedure (e.g., a paging procedure as illustrated by diagram 1100) can be utilized at block 1814 to page the UE. Upon completion of paging at block 1814, or upon determining at block 1812 that the UE is not idle, methodology 1800 can proceed to block 1816, wherein the report(s) identified at block 1810 are requested from the UE. In one example, paging at block 1814 and request(s) made at block 1816 can be combined into a single action upon determining at block 1812 that the UE is idle. Methodology 1800 can then conclude at block 1818, wherein report(s) are obtained from the UE in response to the request(s) made at block 1816.

Figure 19:
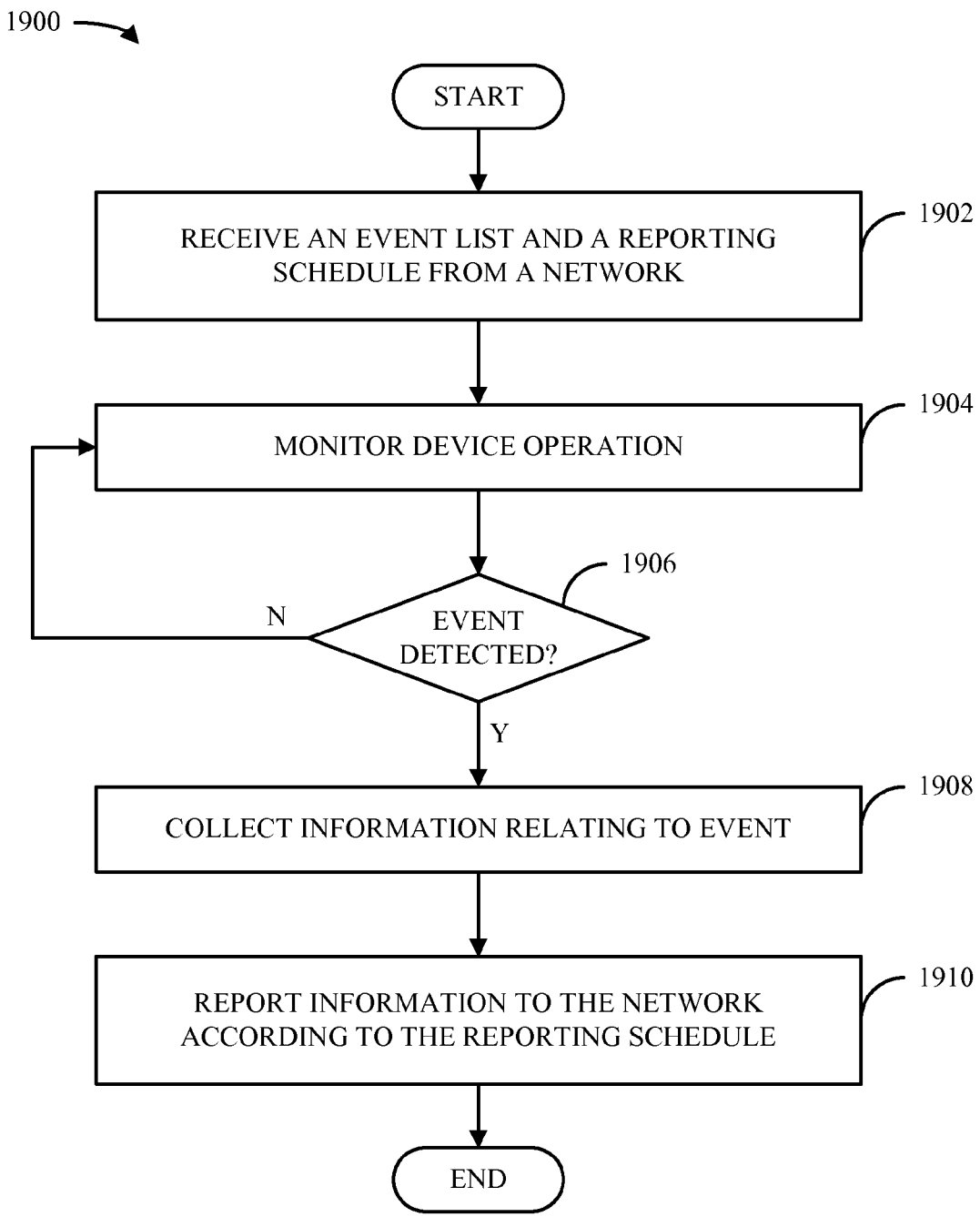
FIGS. 19-20 are flow diagrams of respective methodologies for logging and reporting network events according to a network management scheme.

FIG. 19 is a flow diagram of a methodology 1900 for logging and reporting a network event according to a network management scheme (e.g., a SON policy 212). Methodology 1900 can be performed by, for example, a terminal device (e.g., UE 210) and/or any other suitable network entity. Methodology 1900 begins at block 1902, wherein an event list and a reporting schedule are received from a network (e.g., from a network manager 220 as a SON policy 212). In one example, an event list received at block 1902 can include one or more definitions of standardized events that are utilized within the network. Additionally and/or alternatively, a reporting schedule received at block 1902 can identify times at which reporting is to be conducted and/or information to be provided in reports.

Next, at block 1904, the operation of a device performing methodology 1900 is monitored. Monitoring at block 1904 can include, for example, determining whether failures occur (e.g., by using a failure detector 612), obtaining location and/or network topology information (e.g., via a location monitor 614) and detecting changes thereto, identifying communication resources, transmit power, and/or other operating parameters of the device performing methodology 1900 (e.g., using an operating state monitor 616) and observing changes to such parameters, and/or any other suitable operations. At block 1906, it is determined whether an event has been detected (e.g., by an event detector 610) based on the monitoring at block 1904. If an event has not been detected, monitoring at block 1904 continues. Otherwise, methodology 1900 continues to block 1908, wherein information relating to the detected event is collected. Such information can include, for example, the time of the event (e.g., as determined by a clock 712), resources in power, frequency, etc., used at the time of the event (e.g., as measured by a resource analyzer 714), location and/or network topology information observed (e.g., by a cell state monitor 716) at the time of the event, channel quality and/or other diagnostic information (e.g., as measured by a channel measurement module 718), and/or any other suitable information.

Upon completing the acts described at block 1908, methodology 1900 can conclude at block 1910, wherein information collected at block 1908 is reported to the network (e.g., by a log reporter 810) according to the reporting schedule received at block 1902. In accordance with one aspect, reports can be provided at block 1910 to one or more predetermined destinations (e.g., report destinations 816) at one or more times specified by the reporting schedule (e.g., report schedule 818).

Figure 20:
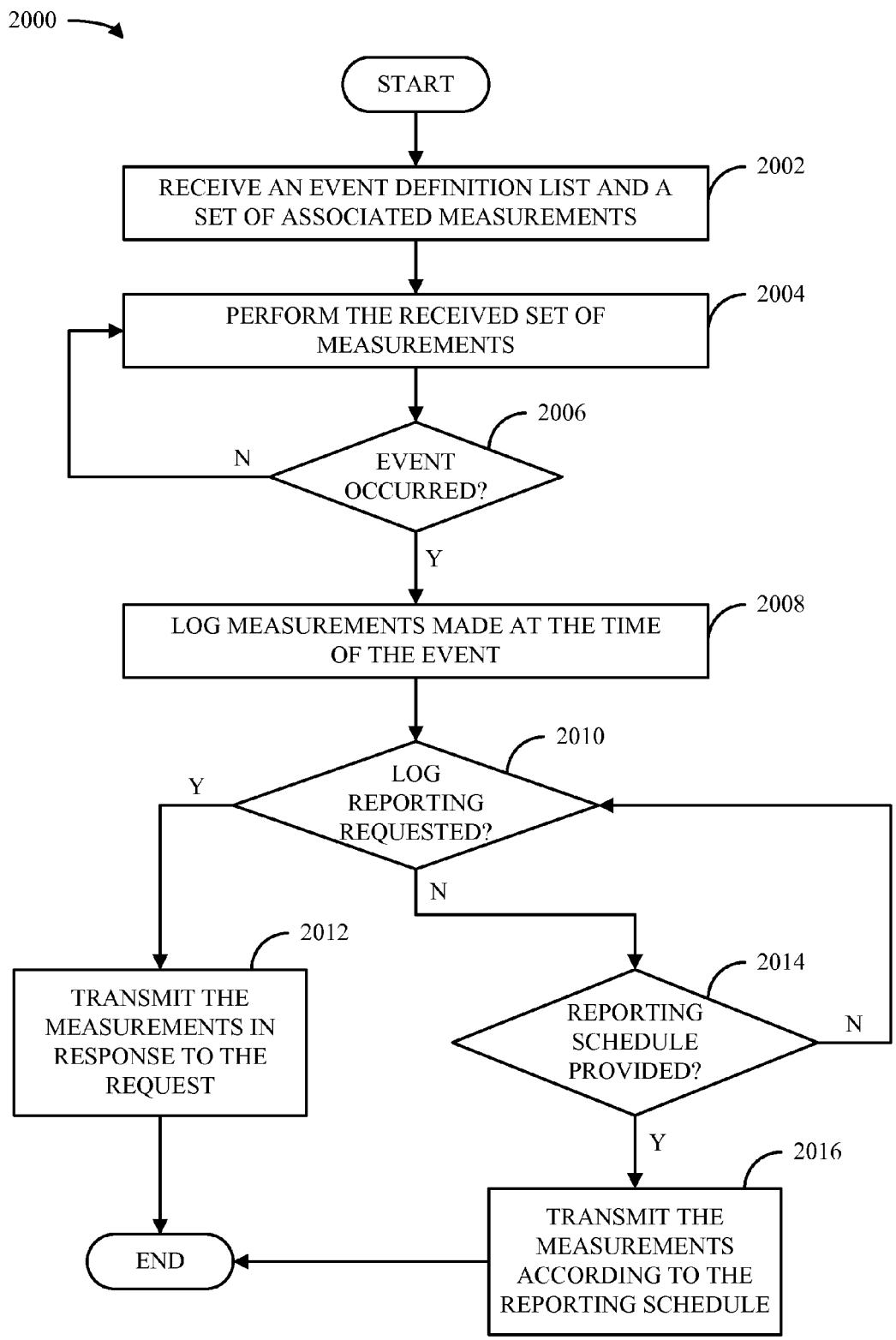

Turning to FIG. 20, illustrated is another methodology 2000 for logging and reporting network events according to a network management scheme. It is to be appreciated that methodology 2000 can be performed by, for example, a UE and/or any other appropriate network entity. Methodology 2000 begins at block 2002, wherein an event definition list and a set of associated measurements are received. At block 2004, the set of measurements received at block 2002 are performed. Next, at block 2006, it is determined whether an event defined in the event definition list has occurred. If such an event has not occurred, measurement at block 2004 continues. Alternatively, if it is determined at block 2006 that such an event has occurred, methodology 2000 continues to block 2008, wherein measurements that were made at block 2004 at the time of the event determined to have occurred at block 2006 are logged.

Following logging at 2006, the logged information corresponding to the event can be reported back to an associated network in a variety of manners. Accordingly, methodology 2000 can proceed to block 2010, wherein it is determined whether log reporting has been requested by the network (e.g., as illustrated by diagram 1100). If log reporting has been requested, methodology 2000 can conclude at block 2012, wherein the logged measurements are transmitted to the network in response to the request. In contrast, if log reporting has not been requested, methodology 2000 can instead proceed to block 2014 to determine whether a reporting schedule has been provided to the entity performing methodology 2000. If it is determined that a reporting schedule has been provided, methodology 2000 can conclude at block 2016, wherein the logged measurements are transmitted according to the provided reporting schedule. If, on the other hand, it is determined that a reporting schedule has not been provided, methodology 2000 can instead return to block 2010 to repeat the attempt to identify a request for log reporting.

Figure 21:
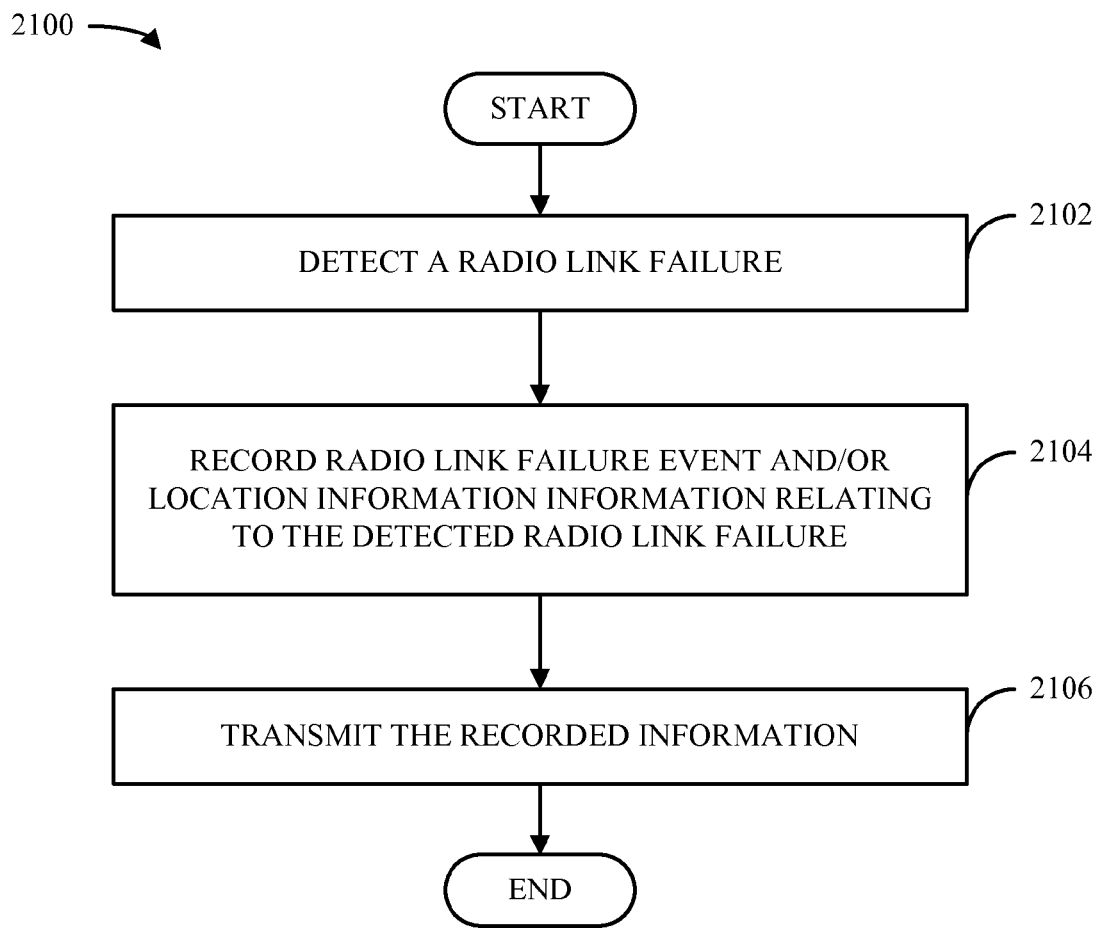
FIGS. 21-22 are flow diagrams of respective methodologies for detecting and reporting a radio link failure event.

FIG. 21 illustrates a methodology 2100 for detecting and reporting a RLF event. Methodology 2100 can be performed by, for example, a terminal and/or any other appropriate network device. Methodology 2100 begins at block 2102, wherein a RLF is detected (e.g., by a RLF detector 912). Methodology 2100 can subsequently proceed to block 2104, wherein RLF event information and/or location information is recorded relating to the RLF detected at block 2102 (e.g., by a RLF detector or a location estimator 914, respectively). Methodology 2100 can then conclude at block 2106, wherein the event information recorded at block 2104 is transmitted (e.g., via a reporting module 918).

Figure 22:
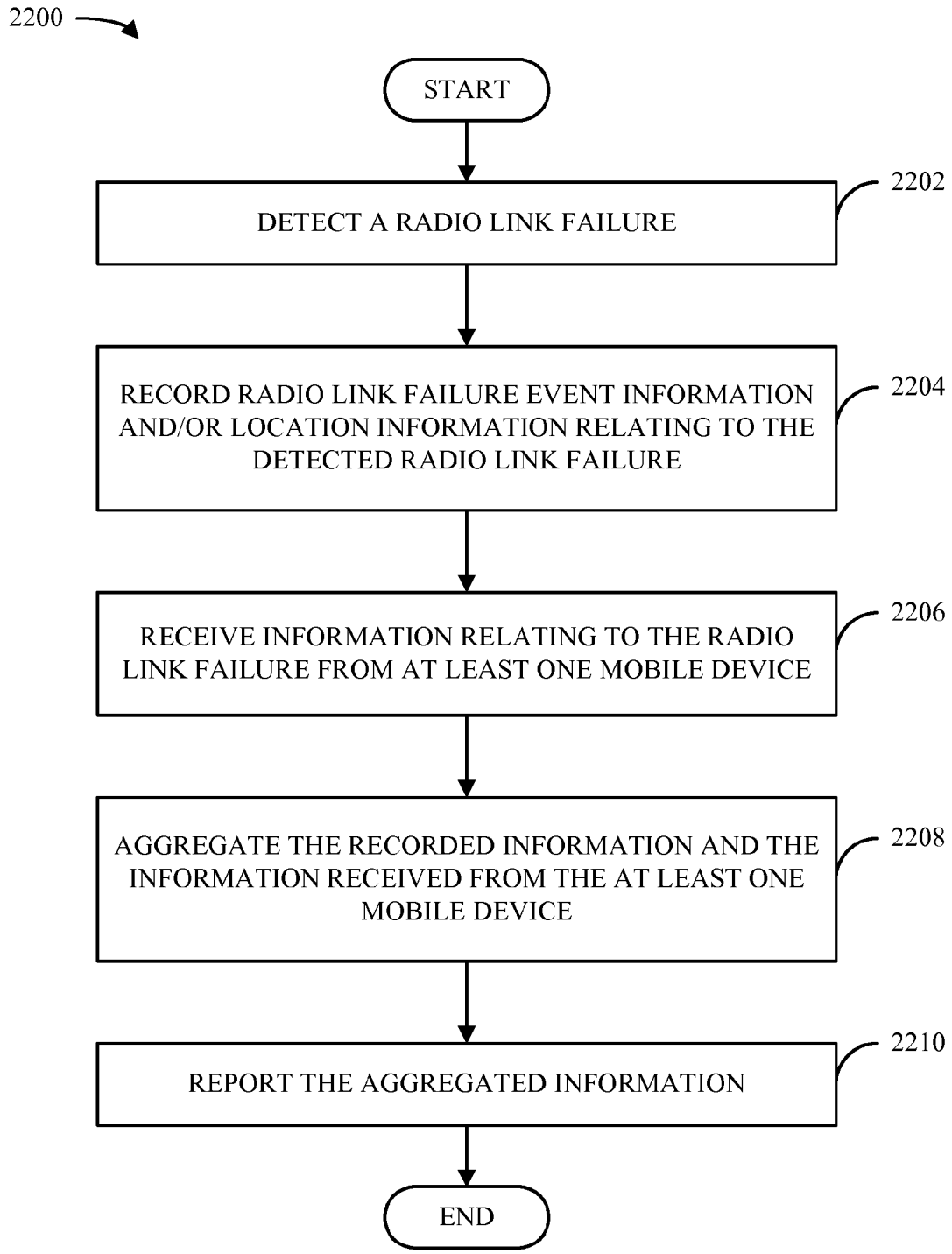

Turning next to FIG. 22, another methodology 2200 for detecting and reporting a RLF event is illustrated. Methodology 2200 can be performed by, for example, a base station and/or any other suitable network device. Methodology 2200 can begin at block 2202, wherein a RLF is detected (e.g., by a RLF detector 922). Methodology 2200 can subsequently proceed to block 2204, wherein RLF event information and/or location information is recorded relating to the RLF detected at block 2202 (e.g., by a RLF detector 922 or a location estimator 924, respectively). Methodology 2200 can then proceed to block 2206, wherein information relating to the RLF detected at block 2202 is received from at least one mobile device (e.g., UE 910). Next, at block 2208, the information recorded at block 2204 and the information received at block 2206 are aggregated (e.g., by an aggregation module 926). Methodology 2200 can then conclude at block 2212, wherein the information aggregated at block 2210 is reported (e.g., via a reporting module 932).

Figure 23:
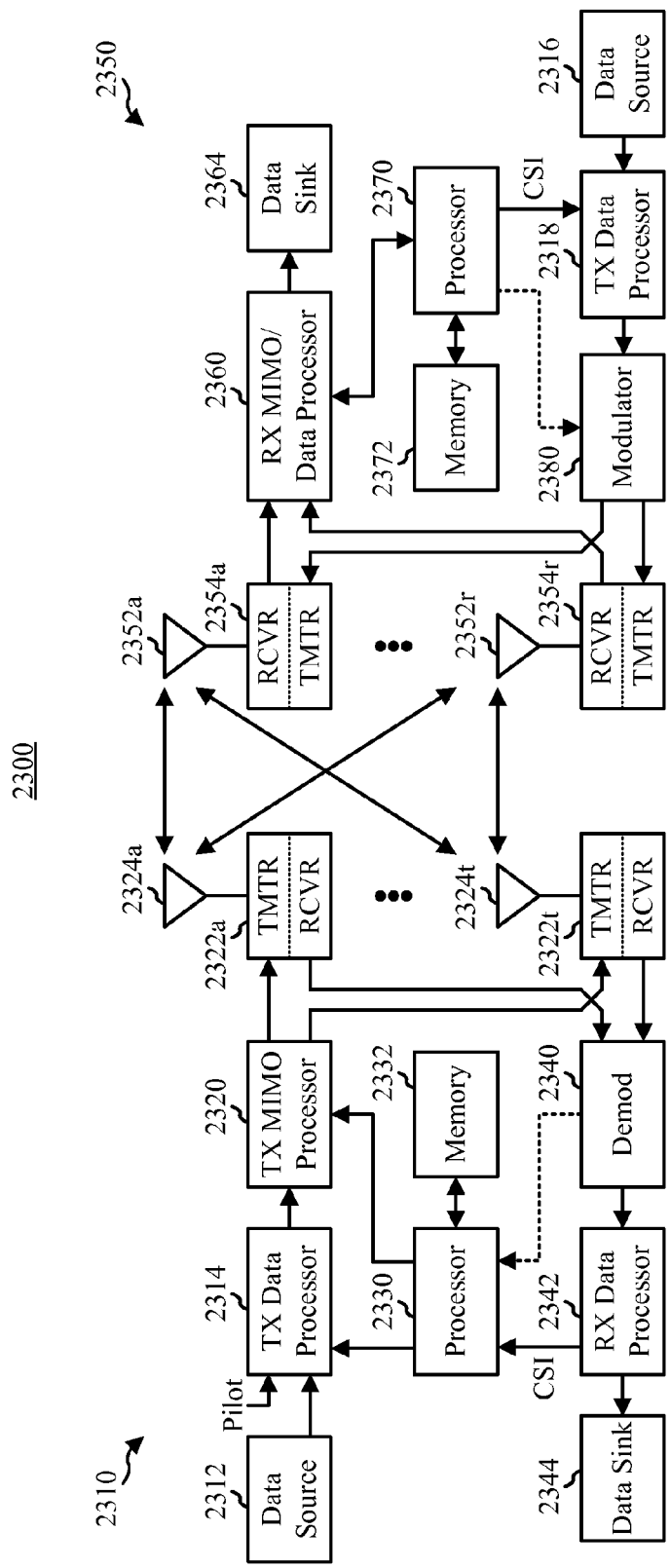
FIG. 23 is a block diagram illustrating an example wireless communication system in which various aspects described herein can function.

Referring now to FIG. 23, a block diagram illustrating an example wireless communication system 2300 in which various aspects described herein can function is provided. In one example, system 2300 is a multiple-input multiple-output (MIMO) system that includes a transmitter system 2310 and a receiver system 2350. It should be appreciated, however, that transmitter system 2310 and/or receiver system 2350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2310 and/or receiver system 2350 described herein could be utilized in connection with a single output to single input antenna system.

In accordance with one aspect, traffic data for a number of data streams are provided at transmitter system 2310 from a data source 2312 to a transmit (TX) data processor 2314. In one example, each data stream can then be transmitted via a respective transmit antenna 2324. Additionally, TX data processor 2314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2350 to estimate channel response. Back at transmitter system 2310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2330.

Next, modulation symbols for all data streams can be provided to a TX processor 2320, which can further process the modulation symbols (e.g., for OFDM). TX MIMO processor 2320 can then provides $N_T$ modulation symbol streams to $N_T$ transceivers 2322a through 2322t. In one example, each transceiver 2322 can receive and process a respective symbol stream to provide one or more analog signals. Each transceiver 2322 can then further condition (e.g., amplify, filter, and upconvert) the analog signals to provide a modulated signal suitable for transmission over a MIMO channel. Accordingly, $N_T$ modulated signals from transceivers 2322a through 2322t can then be transmitted from $N_T$ antennas 2324a through 2324t, respectively.

In accordance with another aspect, the transmitted modulated signals can be received at receiver system 2350 by $N_R$ antennas 2352a through 2352r. The received signal from each antenna 2352 can then be provided to respective transceivers 2354. In one example, each transceiver 2354 can condition (e.g., filter, amplify, and downconvert) a respective received signal, digitize the conditioned signal to provide samples, and then processes the samples to provide a corresponding "received" symbol stream. An RX MIMO/data processor 2360 can then receive and process the $N_R$ received symbol streams from $N_R$ transceivers 2354 based on a particular receiver processing technique to provide $N_T$ "detected" symbol streams. In one example, each detected symbol stream can include symbols that are estimates of the modulation symbols transmitted for the corresponding data stream. RX processor 2360 can then process each symbol stream at least in part by demodulating, deinterleaving, and decoding each detected symbol stream to recover traffic data for a corresponding data stream. Thus, the processing by RX processor 2360 can be complementary to that performed by TX MIMO processor 2320 and TX data processor 2314 at transmitter system 2310. RX processor 2360 can additionally provide processed symbol streams to a data sink 2364.

In accordance with one aspect, the channel response estimate generated by RX processor 2360 can be used to perform space/time processing at the receiver, adjust power levels, change modulation rates or schemes, and/or other appropriate actions. Additionally, RX processor 2360 can further estimate channel characteristics such as, for example, signal-to-noise-and-interference ratios (SNRs) of the detected symbol streams. RX processor 2360 can then provide estimated channel characteristics to a processor 2370. In one example, RX processor 2360 and/or processor 2370 can further derive an estimate of the "operating" SNR for the system. Processor 2370 can then provide channel state information (CSI), which can comprise information regarding the communication link and/or the received data stream. This information can include, for example, the operating SNR. The CSI can then be processed by a TX data processor 2318, modulated by a modulator 2380, conditioned by transceivers 2354a through 2354r, and transmitted back to transmitter system 2310. In addition, a data source 2316 at receiver system 2350 can provide additional data to be processed by TX data processor 2318.

Back at transmitter system 2310, the modulated signals from receiver system 2350 can then be received by antennas 2324, conditioned by transceivers 2322, demodulated by a demodulator 2340, and processed by a RX data processor 2342 to recover the CSI reported by receiver system 2350. In one example, the reported CSI can then be provided to processor 2330 and used to determine data rates as well as coding and modulation schemes to be used for one or more data streams. The determined coding and modulation schemes can then be provided to transceivers 2322 for quantization and/or use in later transmissions to receiver system 2350. Additionally and/or alternatively, the reported CSI can be used by processor 2330 to generate various controls for TX data processor 2314 and TX MIMO processor 2320. In another example, CSI and/or other information processed by RX data processor 2342 can be provided to a data sink 2344.

In one example, processor 2330 at transmitter system 2310 and processor 2370 at receiver system 2350 direct operation at their respective systems. Additionally, memory 2332 at transmitter system 2310 and memory 2372 at receiver system 2350 can provide storage for program codes and data used by processors 2330 and 2370, respectively. Further, at receiver system 2350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 24:
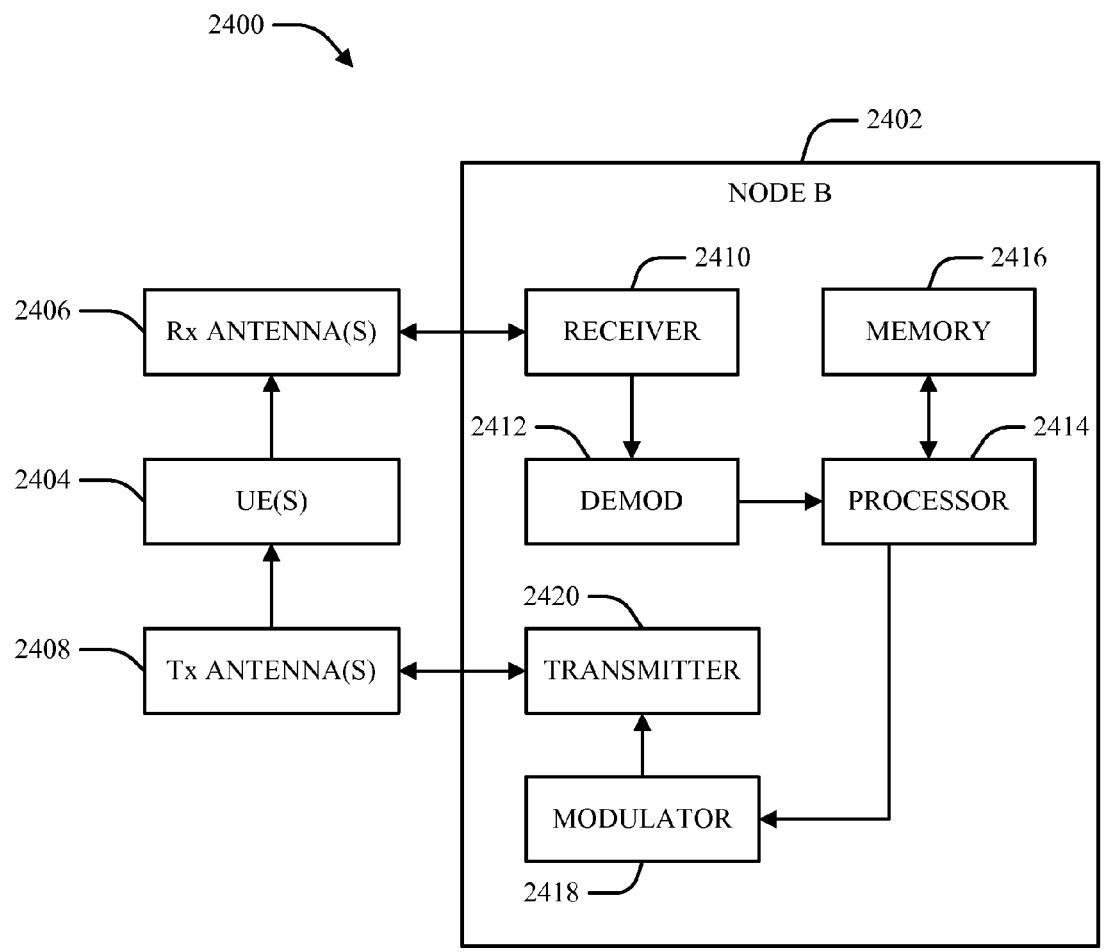
FIGS. 24-25 are block diagrams illustrating example wireless devices operable to implement various aspects described herein.

FIG. 24 is a block diagram of a system 2400 that facilitates network management and optimization in accordance with various aspects described herein. In one example, system 2400 includes a base station or Node B 2402. As illustrated, Node B 2402 can receive signal(s) from one or more UEs 2404 via one or more receive (Rx) antennas 2406 and transmit to the one or more UEs 2404 via one or more transmit (Tx) antennas 2408.

Additionally, Node B 2402 can comprise a receiver 2410 that receives information from receive antenna(s) 2406. In one example, the receiver 2410 can be operatively associated with a demodulator (Demod) 2412 that demodulates received information. Demodulated symbols can then be analyzed by a processor 2414. Processor 2414 can be coupled to memory 2416, which can store information related to code clusters, access terminal assignments, lookup tables related thereto, unique scrambling sequences, and/or other suitable types of information. In one example, Node B 2402 can employ processor 2414 to perform methodologies 1700, 1800, 2200, and/or other similar and appropriate methodologies. Node B 2402 can also include a modulator 2418 that can multiplex a signal for transmission by a transmitter 2420 through transmit antenna(s) 2408.

Figure 25:
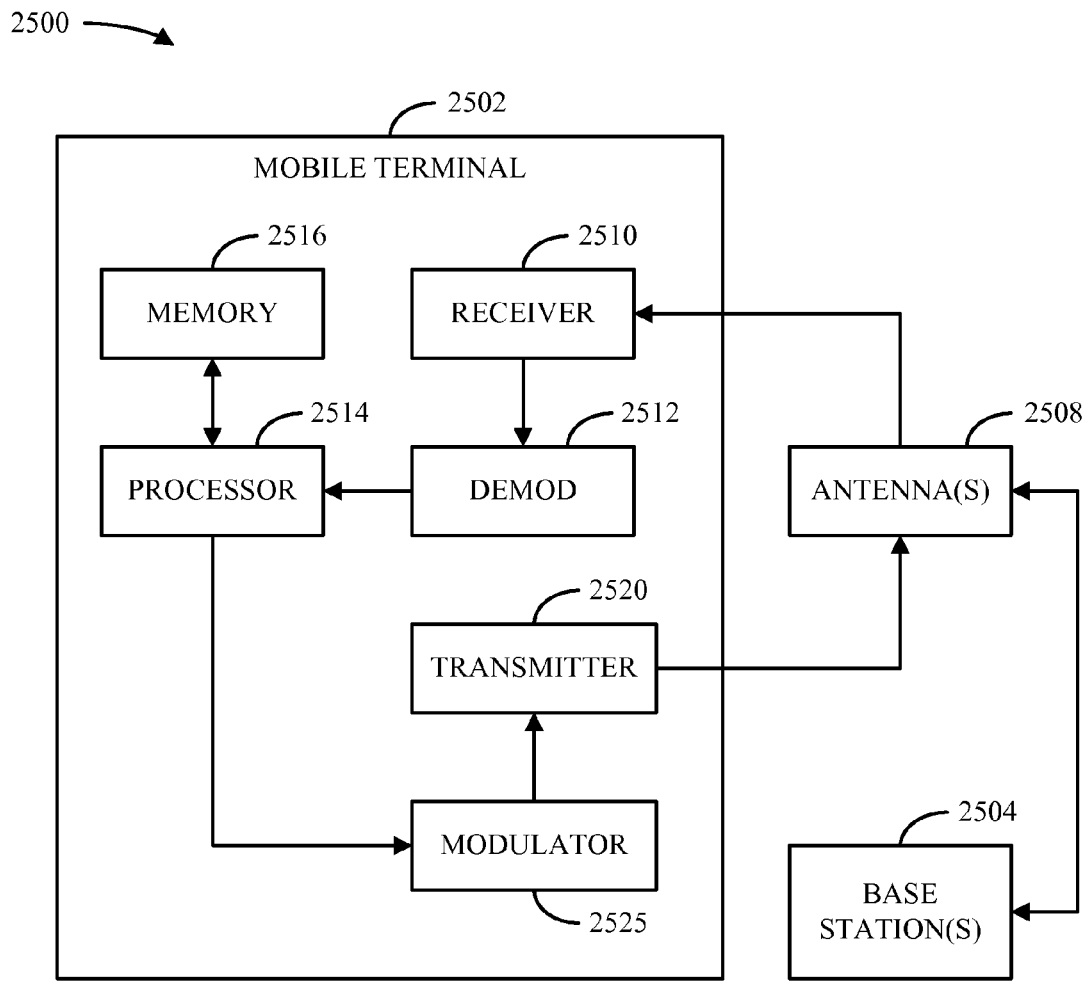

FIG. 25 is a block diagram of a system 2500 that facilitates network event logging and reporting in accordance with various aspects described herein. In one example, system 2500 includes a mobile terminal 2502. As illustrated, mobile terminal 2502 can receive signal(s) from one or more base stations 2504 and transmit to the one or more base stations 2504 via one or more antennas 2508. Additionally, mobile terminal 2502 can comprise a receiver 2510 that receives information from antenna(s) 2508. In one example, receiver 2510 can be operatively associated with a demodulator (Demod) 2512 that demodulates received information. Demodulated symbols can then be analyzed by a processor 2514. Processor 2514 can be coupled to memory 2516, which can store data and/or program codes related to mobile terminal 2502. Additionally, mobile terminal 2502 can employ processor 2514 to perform methodologies 1900, 2000, 2100, and/or other similar and appropriate methodologies. Mobile terminal 2502 can also include a modulator 2518 that can multiplex a signal for transmission by a transmitter 2520 through antenna(s) 2508.

Figure 26:
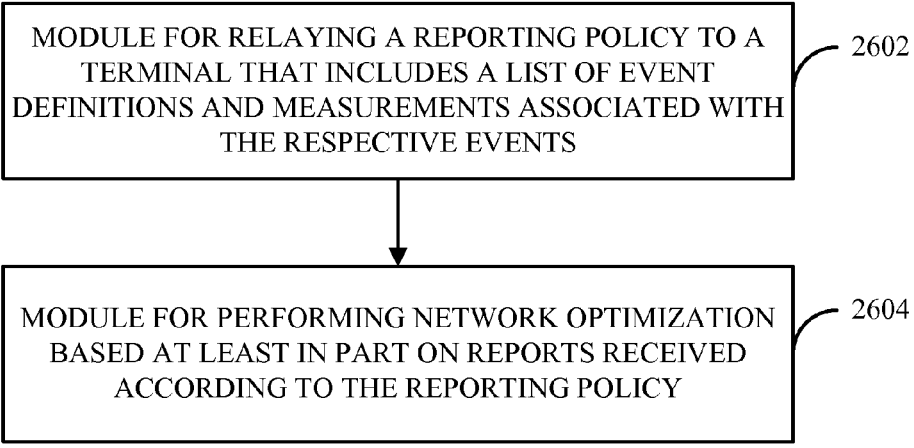
FIGS. 26-27 are block diagrams of respective apparatus that facilitate communication network management and optimization.

FIG. 26 illustrates an apparatus 2600 that facilitates network management and optimization. It is to be appreciated that apparatus 2600 is represented as including functional blocks, which can be functional blocks that represent functions implemented by a processor, software, or combination thereof (e.g., firmware). Apparatus 2600 can be implemented in an access point (e.g., eNB 340 and/or 440), a network controller (e.g., MME 320 and/or 420, SON server 350 and/or 450, etc.) and/or any other appropriate network entity and can include a module 2602 for relaying a reporting policy to a terminal that includes a list of event definitions and measurements associated with the respective events and a module 2604 for performing network optimization based at least in part on reports received according to the reporting policy.

Figure 27:
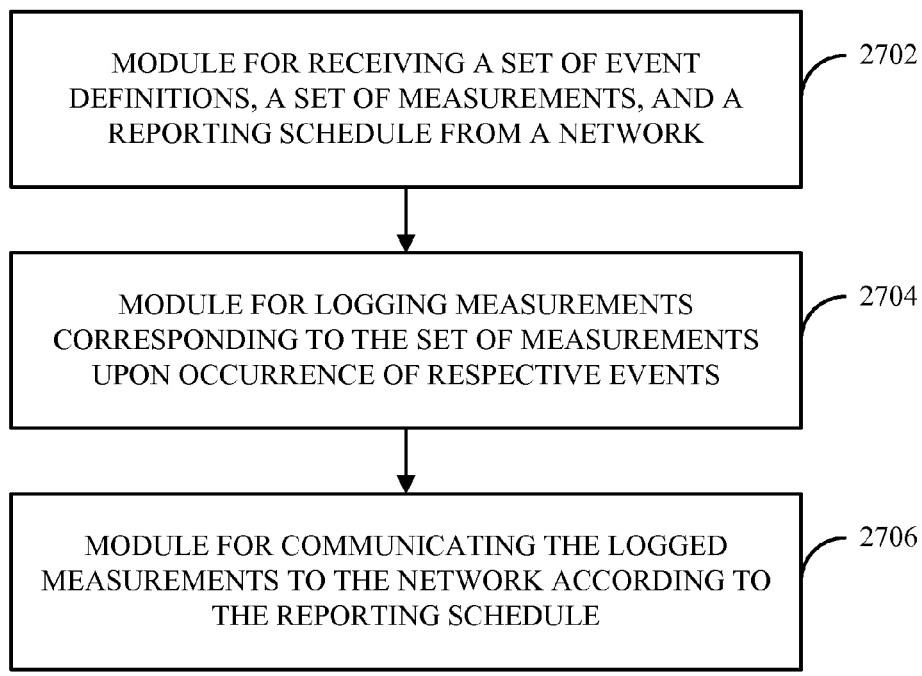

FIG. 27 illustrates another apparatus 2700 that facilitates network management and optimization in accordance with various aspects described herein. It is to be appreciated that apparatus 2700 is represented as including functional blocks, which can be functional blocks that represent functions implemented by a processor, software, or combination thereof (e.g., firmware). Apparatus 2700 can be implemented in a terminal device (e.g., UE 310 and/or 410) and/or any other appropriate network entity and can include a module 2702 for receiving a set of event definitions, a set of measurements, and a reporting schedule from a network; a module 2704 for logging measurements corresponding to the set of measurements upon occurrence of respective events; and a module 2706 for communicating the logged measurements to the network according to the reporting schedule.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for logging and reporting measurements related to network events by a user equipment (UE), comprising:

receiving control plane based messaging from a network that configures the UE for performing one or more measurements related to one or more network events and for logging the one or more measurements, wherein the control plane based messaging is based on a protocol stack that includes one or more access stratum (AS) protocols, wherein the one or more AS protocols includes a radio resource control (RRC) signaling protocol, and wherein the configuring comprises configuring the UE with a trigger for the logging the one or more measurements;

performing the one or more measurements, wherein the performing the one or more measurements comprises determining one or more of a time of the one or more network events, an observed network location at a time associated with the one or more network events, or channel information at a time associated with the one or more network events;

logging at least one of the one or more measurements, based on the configuration;

receiving, via the control plane based messaging, an explicit request from the network to report at least one of the logged one or more measurements; and reporting, via the control plane based messaging, the at least one of the logged one or more measurements to the network based on the request, wherein the reporting comprises transmitting the one or more measurements to a server.

2. The method of claim 1, wherein the one or more network events comprises one of a hardware failure, a connection failure, a radio link failure (RLF), a change to observed network topology, or a change to utilized communication resources.

3. The method of claim 1, wherein the logging comprises storing the logged one or more measurements in a memory.

4. The method of claim 1, wherein the receiving comprises receiving one or more paging messages from the network.

5. An apparatus for logging and reporting measurements related to network events by a user equipment (UE), comprising:

means for receiving control plane based messaging from a network that configures the UE for performing one or more measurements related to one or more network events and for logging the one or more measurements, wherein the control plane based messaging is based on a protocol stack that includes one or more access stratum (AS) protocols, wherein the one or more AS protocols includes a radio resource control (RRC) signaling protocol, and wherein the configuring comprises configuring the UE with a trigger for the logging the one or more measurements;

means for performing the one or more measurements, wherein the means for performing the one or more measurements comprises means for determining one or more of a time of the one or more network events, an observed network location at a time associated with the one or more network events, or channel information at a time associated with the one or more network events;

means for logging at least one of the one or more measurements, based on the configuration;

means for receiving, via the control plane based messaging, an explicit request from the network to report at least one of the logged one or more measurements; and means for reporting, via the control plane based messaging, the at least one of the logged one or more measurements to the network based on the request, wherein the means for reporting comprises means for transmitting the one or more measurements to a server.

6. The apparatus of claim 5, wherein the one or more network events comprises one of a hardware failure, a connection failure, a radio link failure (RLF), a change to observed network topology, or a change to utilized communication resources.

7. The apparatus of claim 5, wherein the logging comprises storing the logged one or more measurements in a memory.

8. The apparatus of claim 5, wherein the receiving comprises receiving one or more paging messages from the network.

9. An apparatus for logging and reporting measurements relating to network events by a user equipment (UE), comprising:

at least one processor configured to:
receive control plane based messaging from a network that configures the UE for performing one or more measurements related to one or more network events and for logging the one or more measurements, wherein the control plane based messaging is based on a protocol stack that includes one or more access stratum (AS) protocols, wherein the one or more AS protocols includes a radio resource control (RRC) signaling protocol, and wherein the configuring comprises configuring the UE with a trigger for the logging the one or more measurements;

perform the one or more measurements, wherein the performing the one or more measurements comprises determining one or more of a time of the one or more network events, an observed network location at a time associated with the one or more network events, or channel information at a time associated with the one or more network events; and log at least one of the one or more measurements, based on the configuration;

a receiver configured to receive, via the control plane based messaging, an explicit request from the network to report at least one of the logged one or more measurements; and a transmitter configured to report, via the control plane based messaging, the at least one of the logged one or more measurements to the network based on the request, wherein the reporting comprises transmitting the one or more measurements to a server.

10. The apparatus of claim 9, wherein the one or more network events comprises one of a hardware failure, a connection failure, a radio link failure (RLF), a change to observed network topology, or a change to utilized communication resources.

11. The apparatus of claim 9, wherein the logging comprises storing the logged one or more measurements in a memory.

12. The apparatus of claim 9, wherein the receiving comprises receiving one or more paging messages from the network.

13. A non-transitory computer readable medium having instructions stored thereon, the instructions executable by one or more processors for logging and reporting measurements related to network events by a user equipment (UE), the instructions comprising:

receiving control plane based messaging from a network that configures the UE for performing one or more measurements related to one or more network events and for logging the one or more measurements, wherein the control plane based messaging is based on a protocol stack that includes one or more access stratum (AS) protocols, wherein the one or more AS protocols includes a radio resource control (RRC) signaling protocol, and wherein the configuring comprises configuring the UE with a trigger for the logging the one or more measurements;

performing the one or more measurements, wherein the performing the one or more measurements comprises determining one or more of a time of the one or more network events, an observed network location at a time associated with the one or more network events, or channel information at a time associated with the one or more network events;

logging at least one of the one or more measurements, based on the configuration;

receiving, via the control plane based messaging, an explicit request from the network to report at least one of the logged one or more measurements; and reporting, via the control plane based messaging, the at least one of the logged one or more measurements to the network based on the request, wherein the reporting comprises transmitting the one or more measurements to a server.

14. The non-transitory computer readable medium of claim 13, wherein the one or more network events comprises one of a hardware failure, a connection failure, a radio link failure (RLF), a change to observed network topology, or a change to utilized communication resources.

15. The non-transitory computer readable medium of claim 13, wherein the logging comprises storing the logged one or more measurements in a memory.

16. The non-transitory computer readable medium of claim 13, wherein the receiving comprises receiving one or more paging messages from the network.

* * * * *